(12) United States Patent
Chun et al.

(10) Patent No.: US 9,734,663 B2
(45) Date of Patent: Aug. 15, 2017

(54) AUTOMATED MONEY LAUNDERING DETECTION, NOTIFICATION, AND REPORTING TECHNIQUES IMPLEMENTED AT CASINO GAMING NETWORKS

(71) Applicants: FRESH IDEA GLOBAL LIMITED, Hong Kong (HK); Binh Nguyen, Reno, NV (US)

(72) Inventors: Jay Chun, Las Vegas, NV (US); Binh Nguyen, Reno, NV (US)

(73) Assignees: Fresh Idea Global Limited, Hong Kong (HK); Binh Nguyen, Reno, NV (US)

( * ) Notice: Subject to any disclaimer, the term of this patent is extended or adjusted under 35 U.S.C. 154(b) by 0 days.

(21) Appl. No.: 15/186,289

(22) Filed: Jun. 17, 2016

(65) Prior Publication Data
US 2016/0292963 A1  Oct. 6, 2016

Related U.S. Application Data

(63) Continuation of application No. 14/231,736, filed on Mar. 31, 2014, now Pat. No. 9,384,629.

(51) Int. Cl.
| | | |
|---|---|---|
| G06F 17/00 | (2006.01) | |
| G07F 17/32 | (2006.01) | |
| G06Q 20/10 | (2012.01) | |
| G07G 3/00 | (2006.01) | |
| G06Q 20/40 | (2012.01) | |

(52) U.S. Cl.
CPC ..... *G07F 17/3241* (2013.01); *G06Q 20/1085* (2013.01); *G06Q 20/4016* (2013.01); *G07F 17/3234* (2013.01); *G07G 3/003* (2013.01)

(58) Field of Classification Search
CPC ............. G07F 17/3239; G07F 17/3241; G07F 17/3234; G06Q 20/4016; G06Q 20/1085; G07G 3/003
See application file for complete search history.

(56) References Cited

U.S. PATENT DOCUMENTS

| | | |
|---|---|---|
| 6,241,608 B1 | 6/2001 | Torango |
| 7,762,887 B1 | 7/2010 | House et al. |
| 7,922,587 B2 | 4/2011 | Chun |
| 8,360,838 B2 | 1/2013 | Nguyen et al. |
| 2002/0058550 A1 | 5/2002 | Pace et al. |
| 2002/0147042 A1 | 10/2002 | Vuong et al. |
| 2003/0013510 A1 | 1/2003 | Vuong et al. |
| 2003/0236113 A1 | 12/2003 | Webb |
| 2006/0111092 A1 | 5/2006 | Harris et al. |
| 2006/0252530 A1 | 11/2006 | Oberberger et al. |
| 2006/0287101 A1 | 12/2006 | Crawford et al. |
| 2007/0060259 A1 | 3/2007 | Pececnik |
| 2007/0265049 A1 | 11/2007 | Black |
| 2008/0070658 A1 | 3/2008 | Labgold et al. |

(Continued)

OTHER PUBLICATIONS

PCT International Search Report, PCT Application No. PCT/CN2013/074516 based on U.S. Appl. No. 13/844,142, International Filling Date Apr. 22, 2013, Search report mailed Jul. 25, 2013.

(Continued)

*Primary Examiner* — Dmitry Suhol
*Assistant Examiner* — Carl V Larsen
(74) *Attorney, Agent, or Firm* — Dean E. Wolf, Esq.

(57) ABSTRACT

Various aspects described or referenced herein are directed to different methods, systems, and computer program products for implementing automated money laundering detection, notification, and reporting techniques implemented at casino gaming networks.

26 Claims, 11 Drawing Sheets

(56) References Cited

U.S. PATENT DOCUMENTS

| | | |
|---|---|---|
| 2008/0096659 A1 | 4/2008 | Kreloff et al. |
| 2009/0062008 A1 | 3/2009 | Karmarkar |
| 2009/0124376 A1* | 5/2009 | Kelly .................. G07F 17/3206 463/29 |
| 2009/0131151 A1 | 5/2009 | Harris |
| 2009/0131160 A1 | 5/2009 | Torres |
| 2009/0291762 A1 | 11/2009 | Walker |
| 2010/0093429 A1* | 4/2010 | Mattice .................. G07F 1/06 463/25 |
| 2010/0105460 A1 | 4/2010 | Makhoul |
| 2012/0004037 A1 | 1/2012 | Hill |
| 2012/0115590 A1 | 5/2012 | Rowe |
| 2012/0143649 A1 | 6/2012 | Aubertin |
| 2012/0203698 A1 | 8/2012 | Duncan et al. |
| 2013/0039543 A1 | 2/2013 | Fuhr et al. |
| 2013/0084972 A1 | 4/2013 | Frady |
| 2013/0203481 A1 | 8/2013 | Miller et al. |

OTHER PUBLICATIONS

Written Opinion of International Searching Authority, PCT Application No. PCT/CN2013/074516 based on U.S. Appl. No. 13/844,142, International Filing Date Apr. 22, 2013, Written Opinion mailed Jul. 25, 2013.

Department of the Treasury Financial Crimes Enforcement Network, FIN-2008-G007, Recognizing Suspicious Activity—Red Flags for Casinos and Card Clubs, Issued Aug. 1, 2008.

Department of the Treasury Financial Crimes Enforcement Network, FIN-2009-G004, Frequently Asked Questions Casino Recordkeeping, Reporting, and Compliance Program Requirements, Issued Sep. 30, 2009.

Department of the Treasury Financial Crimes Enforcement Network, Suspicious Activity Reporting in the Gaming Industry, Issued Mar. 2012.

FOBTs 'used for money laundering', intergameonline.com, http://intergameonline.com/coin-op/news/10504/fobts-used-for-money-laundering, published Nov. 12, 2013.

irs.gov, http://www.irs.gov/Government-Entities/Indian-Tribal-Governments/ITG-FAQ-#8-Answer-What-are-the-reporting-requirements-for-casinos?, ITG FAQ #8 Answer—What are the reporting requirements for casinos?, published Dec. 11, 2013.

Reviewjournal.com, http://www.reviewjournal.com/buisness/casinos-gaming/amid-us-inquiries-ceasars-hires-top-money-laundering-offical, Amid U.S. inquiries, Ceasars, hires top money laundering official, written Feb. 3, 2015, posted Feb. 4, 2015.

\* cited by examiner

AUTOMATED MONEY LAUNDERING DETECTION, NOTIFICATION, AND REPORTING TECHNIQUES IMPLEMENTED AT CASINO GAMING NETWORKS

RELATED APPLICATION DATA

This application is a continuation application, pursuant to the provisions of 35 U.S.C. §120, of prior U.S. patent application Ser. No. 14/231,736 titled "AUTOMATED MONEY LAUNDERING DETECTION, NOTIFICATION, AND REPORTING TECHNIQUES IMPLEMENTED AT CASINO GAMING NETWORKS" by Chun et al., filed on 31 Mar. 2014, the entirety of which is incorporated herein by reference for all purposes.

BACKGROUND

The present disclosure relates generally to financial transactions in casino networks. More particularly, the present disclosure relates automated money laundering detection, notification, and reporting techniques implemented at casino gaming networks.

Casinos and card clubs are vulnerable to money laundering and other financial crimes because of the nature of their operations. This may be due, in part, to the fact that casino gaming institutions are typically fast-paced, cash-intensive businesses that often provide a broad array of financial products and services, some of which are similar to those provided by depository institutions and money services businesses. Additionally, criminals wishing to engage in anonymous money laundering activities may advantageously exploit the fact that casino gaming institutions typically serve a diverse and transient customer base.

DETAILED DESCRIPTION OF EXAMPLE EMBODIMENTS

Overview

Figure 1:
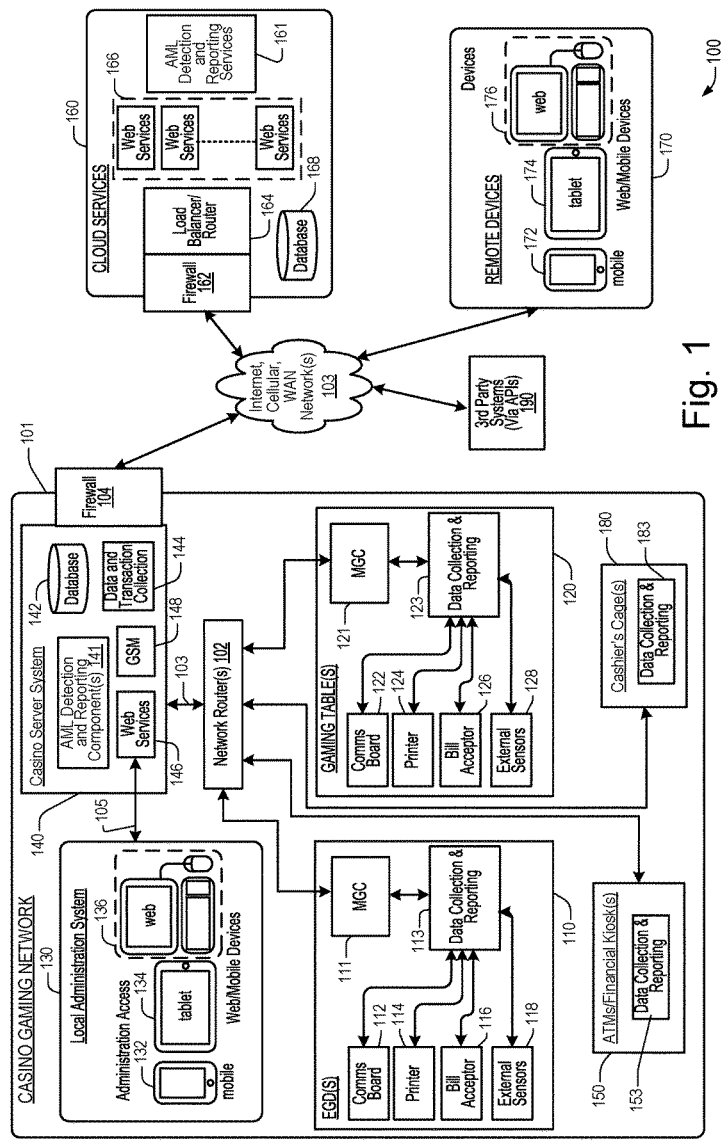
FIG. 1 illustrates an example embodiment of a Gaming Network 100 which may be configured or designed to implement various automated money laundering detection and reporting techniques described and/or referenced herein.

Various aspects described or referenced herein are directed to different methods, systems, and computer program products for implementing automated money laundering detection, notification, and reporting techniques implemented at casino gaming networks.

One aspect disclosed herein is directed to different methods, systems, and computer program products for facilitating automated detection of suspect money laundering activities implemented in a casino gaming network. At least one processor may be caused to execute a plurality of instructions for: causing a Transaction Analysis component of the casino gaming network to identify a first financial transaction event for analysis, the first financial transaction event relating to a financial transaction occurring at a first casino establishment and involving a creation or use of a first cash or credit voucher issued by the first casino establishment, the first financial transaction event having associated therewith a first set of transaction event details; causing an AML Detection component of the casino gaming network to dynamically analyze the first set of transaction event details to determine if the first financial transaction event is classifiable as suspect money laundering activity; and if a first set of conditions has been satisfied, dynamically causing at least one electronic component of the casino gaming network to track a real-time location of the first cash or credit voucher at the first casino establishment over a first subsequent time interval.

In some embodiments, various method(s), system(s) and/or computer program product(s) may be operable to: receive updated financial transaction information from a first gaming device or a first gaming table, the updated financial transaction information including information relating to at least one financial transaction event involving the first gaming device or first gaming table; wherein the updated financial transaction information includes the first financial transaction event.

In some embodiments, the first set of predetermined criteria corresponds to a first set of threshold ML analysis trigger criteria, and at least one processor may be caused to execute additional instructions for: analyzing the first set of transaction event details to determine whether the first financial transaction satisfies the first set of threshold ML analysis trigger criteria; and if it is determined that the first financial transaction satisfies the first set of threshold ML analysis trigger criteria, performing additional analysis of the first financial transaction event in order to determine whether the first financial transaction event is to be classified as a suspect money laundering activity.

In some embodiments, the generating and transmitting of the first suspicious activity alert message includes: generating, in substantially real-time, the first suspicious activity alert message; identifying, in substantially real-time, a first set of subscribers who have registered or subscribed to receive the first suspicious activity alert message; and transmitting, in substantially real-time, the first suspicious activity alert message to each of the identified first set of subscribers;

In some embodiments, the generating and transmitting of the first suspicious activity alert message includes: generating, in substantially real-time, the first suspicious activity alert message; identifying, in substantially real-time, a first casino security person who's current location is within a specified proximity to the identified location where the first financial transaction event has occurred; and transmitting, in substantially real-time, the first suspicious activity alert message to the first casino security person.

In some embodiments, the generating and transmitting of the first suspicious activity alert message includes: generating, in substantially real-time, the first suspicious activity alert message; identifying, in substantially real-time, a first set of casino personnel who have registered or subscribed to receive the first suspicious activity alert message; and transmitting, in substantially real-time, the first suspicious activity alert message to each of the identified first set of casino personnel.

In some embodiments, the generating and transmitting of the first suspicious activity alert message includes: generating, in substantially real-time, the first suspicious activity alert message; selecting, in substantially real-time, the first recipient for receiving transmission of the first suspicious activity alert message, wherein the selecting of the first recipient is based, at least partially, on a current location of the first recipient; and transmitting, in substantially real-time, the first suspicious activity alert message to the first recipient.

In some embodiments, the generating and transmitting of the first suspicious activity alert message includes: generating, in substantially real-time, the first suspicious activity alert message; determining and assigning a priority or urgency for transmission of the first suspicious activity alert message; identifying, in substantially real-time, the first recipient based, at least partially, on the priority or urgency assigned to the first suspicious activity alert message; and transmitting, in substantially real-time, the first suspicious activity alert message to the first casino security person.

In some embodiments, the first set of predetermined criteria corresponds to a first set of threshold ML analysis trigger criteria, and at least one processor may be caused to execute additional instructions for: analyzing the first set of transaction event details to determine whether the first financial transaction satisfies the first set of threshold ML analysis trigger criteria; if it is determined that the first financial transaction satisfies the first set of threshold ML analysis trigger criteria, performing additional analysis of the first financial transaction event in order to determine whether the first financial transaction event is to be classified as a suspect money laundering activity, wherein the additional analysis of the first financial transaction event includes: (i) automatically analyzing, using a first set of predefined suspicious activity patterns, the first set of transaction event details to determine whether the first set of transaction details matches at least one suspicious activity pattern; and (ii) classifying the first financial transaction event as a suspect money laundering activity if it is determined that the first set of transaction event details matches at least one suspicious activity pattern.

In some embodiments, the first set of actions further includes: automatically generating an electronic report which includes a first set of information relating to the first financial transaction event which has been identified as a suspect money laundering activity; and electronically filing the electronic report with at least one regulatory authority.

In some embodiments, at least one processor may be caused to execute additional instructions for: monitoring, in substantially real-time, wager-based gaming activities occurring at the casino establishment; capturing and forwarding, to a first data analysis system and in substantially real-time, financial transaction information relating to the wager-based gaming activities, wherein the financial transaction information includes information relating to the first financial transaction event.

In some embodiments, the first set of first transaction event details includes one or more of the following (or combinations thereof): known associations between person performing suspicious activity and other persons; information relating to concurrent conditions and/or events relative to the first transaction event; information relating to historical transaction activities associated with an identified person; game-related information; wager-related information; information relating to an identity and location of gaming device/table where the first transaction event occurred; information relating to an identity of other gaming device(s)/table(s) in which similar suspicious transaction event(s) have been detected; information relating to an identity of gaming table attendant(s) servicing gaming table/gaming device at time of the first transaction event; information relating to identities of other players participating at a gaming table/gaming device at time of the first transaction event; information relating to an identity of gaming table attendant(s) servicing gaming table/gaming device at time of the first transaction event; information relating to an identity and location of financial kiosk machine where the first transaction event took place; information relating to an identity and location of cashier cage where the first transaction event took place; information relating to an identity of cashier attendant(s) on duty at cashier cage where the first transaction event took place; and/or casino identifier and location information.

In some embodiments, the first set of actions further includes one or more of the following (or combinations thereof): capturing an image of a first patron who is involved with the first transaction event; geolocation capture of the first transaction event; geolocation capture of gaming device involved in the first transaction event; geolocation capture of mobile device(s) associated with one or more persons involved with the first transaction event; geotracking of at least one person involved with the first transaction event; tracking of casino chips in possession by at least one person involved with the first transaction event; causing a delay in a completion of the first transaction event; delaying transaction processing of the first transaction event; and/or providing graphical user interface (GUI) which is configured or designed to display a portion of a casino floor, and is further configured or designed to identifying a location associated with an occurrence or detection of the first transaction event.

In some embodiments, the first set of predetermined criteria corresponds to a first set of threshold ML analysis trigger criteria, and at least one processor may be caused to execute additional instructions for: analyzing the first set of transaction event details to determine whether the first financial transaction satisfies the first set of threshold ML analysis trigger criteria; if it is determined that the first financial transaction satisfies the first set of threshold ML analysis trigger criteria, performing additional analysis of the first financial transaction event in order to determine whether the first financial transaction event is to be classified as a suspect money laundering activity, wherein the additional analysis of the first financial transaction event includes automatically classifying the first financial transaction event as a suspect money laundering activity if it is determined that the first set of transaction event details matches at least one predefined suspicious activity pattern.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Casinos and card clubs are vulnerable to money laundering and other financial crimes because of the nature of their operations. These gaming institutions are fast-paced, cash-intensive businesses that often provide a broad array of financial products and services, some of which are similar to those provided by depository institutions and money services businesses. Moreover, gaming institutions serve a diverse and transient customer base about which they may have relatively little knowledge. In the US, many casinos are subject to anti-money laundering regulations promulgated under the Bank Secrecy Act (BSA).

The definition of a financial institution at 31 CFR §1010.100(t) includes gaming establishments with gross annual gaming revenue greater than $1 million that are licensed or authorized to do business as casinos or card clubs in the United States, whether under the laws of a State, territory or possession of the United States, or under the Indian Gaming Regulatory Act (IGRA) or other Federal, State, or tribal law or arrangement affecting Indian lands. For example, tribal gaming establishments that offer slot machines, video lottery terminals, or table games and that have gross annual gaming revenue in excess of $1 million are subject to FinCEN's (Financial Crimes Enforcement Network) regulatory requirements. The definition applies to both land-based and riverboat operations. Card clubs generally are subject to the same rules as casinos, unless a different treatment for card clubs is explicitly stated in FinCEN's regulations.

In addition, 31 CFR §1021.320 require many casinos and card clubs to report suspicious transactions (or patterns of transactions) conducted or attempted by, at or through the gaming establishment. Such casinos and card clubs may thus be required to report suspicious transactions on FinCEN Form 102, Suspicious Activity Report by Casinos and Card Clubs (herein referred to as "SAR-C"). SAR-Cs serve as a valuable tool to help law enforcement deter and track illicit activity. Gaming establishments subject to FinCEN regulations may also be required to submit Currency Transaction Report by Casinos (CTRC) filings on cash transactions exceeding $10,000.

The Internal Revenue Service (IRS) examines casinos and card clubs, including those that operate in tribal jurisdictions, for compliance with FinCEN's regulations. If the IRS identifies deficiencies, it refers the matter to FinCEN for disposition, including consideration of civil money penalties and remedial actions. In general, three types of gaming establishments may be required to file SAR-Cs: state-licensed casinos, tribal casinos, and card clubs.

Both state-licensed and tribal casinos typically offer games where customers essentially bet against the casino or "house." Examples of such games are blackjack, roulette, slot machines, bingo, and keno. Casinos also offer customers a variety of financial services, including maintaining accounts, accepting deposits into these accounts, issuing credit and receiving payments on credit, cashing checks, issuing casino checks, sending and receiving wire transfers, and exchanging currency. Many financial transactions take place at the "cage" or casino bank Financial transactions may also occur at casino gaming areas, where customers can buy tokens for slot machines or chips for table games. Card clubs offer many of the same financial services as traditional casinos. Like casinos, card clubs may maintain a cage where cashiers conduct financial transactions. However, unlike casinos, card clubs rarely extend credit to customers.

Casinos and other gaming establishments that are subject to the federal Bank Secrecy Act ("BSA") may desire to implement anti-money laundering programs that include procedures for detecting and reporting suspicious transactions, and for assisting with the identification and reporting of suspicious transactions.

Various embodiments of automated money laundering detection and reporting techniques described herein are directed to different methods and systems for enabling automated, rule-based monitoring, analysis, detection and reporting of suspicious activities relating to financial or monetary transactions (referred to herein as "financial transactions") conducted in casino gaming establishments, casino networks, and/or non-casino environments. Examples of various types of financial transactions may include, but are not limited to, one or more of the following (or combinations thereof):
  cash transactions;
  cash in transactions;
  cash out transactions;
  credit transactions;
  wagering transactions;
  money exchange transactions;
  money deposit transactions;
  money withdrawal transactions;
  wagering token transactions;
  payout transactions;
  purchase transactions;
  money transfer transactions;
  and/or other types of financial transactions which may occur at casino gaming establishments and/or casino networks.

One or more of these transactions may occur at various casino-related devices, machines, systems, and/or locations of the casino environment such as, for example, one or more of the following (or combinations thereof):
  slot machines;
  mobile gaming devices;
  gaming tables (e.g., poker, black jack, baccarat, etc.);
  electronic gaming machines (EGMs);
  ATMs;
  financial kiosks;
  cashier cages;

Other transactions may occur at various devices, machines, systems, and/or locations of non-casino environments such as, for example, one or more of the following (or combinations thereof):
  computer terminals;
  tablets;
  smart phones;
  and/or other types of electronic devices which may be authorized or approved to function as a wager-based gaming device.

According to different embodiments, information relating to casino-related financial transactions may be captured (e.g., in real-time or non-real-time) at the device or system where the financial transaction is taking place, and uploaded (e.g., in real-time or non-real-time) to a central server. For example, at the casino gaming devices and/or game tables, players may either deposit their money (cash and/or ticket vouchers), or put up credits (pre-established credit accounts), as well as removing them. Regardless, these types of data may be captured, uploaded, and analyzed for suspicious activities. Preferably, the capturing and uploading of the financial transaction information may be performed in real-time so as to allow the casino to detect and respond to suspicious money laundering activities in a timely manner.

In at least one embodiment, the uploaded financial transaction information may be analyzed at a casino server system for detection of suspicious money laundering activities. Financial transactions which are flagged as potentially suspicious money laundering activities may be logged, and additional analysis may be performed if specific triggering criteria is satisfied. For example, in at least one embodiment, a multi-step analysis process may be utilized for suspicious money laundering (ML) activity analysis, whereby all (or selected) financial transactions are each initially screened and analyzed for one or more triggering events/conditions which, if satisfied, may necessitate additional (in-depth) suspicious ML activity analysis of the identified financial transaction. For example, in some embodiments, less than 1% of the total casino-related financial transactions analyzed may undergo in-depth suspicious ML activity analysis.

By way of example, in one embodiment, in-depth suspicious ML activity analysis may be triggered in response to detecting that total consecutive money cashed in (e.g., for a given player over a given time period such as, for example, 3 minutes) exceeds $3000 or some other specified threshold value.

In some embodiments, a substantial cash in (e.g., at least $3000), follow by a minimum amount of gaming (e.g., at least 3 games of at least $20 wager each), followed by a cash out, can trigger a deeper analysis for suspicious ML activity.

In some embodiments, in-depth suspicious ML activity analysis may be triggered in response to detecting that cumulative money cashed in for a given player over a given time period exceeds some specified threshold value. For example, frequent money-in into a gaming terminal, at 3-minute to 5-minute intervals, of $3000 or more each time, for a total of more than $10,000 in 15 minutes, may trigger a deeper analysis for suspicious ML activity.

In some embodiments, in-depth suspicious ML activity analysis may be triggered in response to detecting that total consecutive money cashed out (e.g., for a given player over a given time period) such exceeds some specified threshold value. For example, frequent cash-out events at a gaming terminal, at 1-minute to 5-minute intervals, of $2000 or more each time, for a total of more than $9,000 over a 20-minute time window, may trigger a deeper analysis for suspicious ML activity.

In some embodiments, in-depth suspicious ML activity analysis may be triggered in response to detecting that total money cashed out (for a given player over a given time period) exceeds some specified threshold value.

In yet other embodiments, the triggering of in-depth suspicious ML activity analysis may be based, at least partially, on statistical information relating to one or more group(s) of gaming devices over a period of time, and/or may be based, at least partially, on statistical information relating to other types of financial transactions which occur over one or more specified time periods(s).

For example, financial transactions for a given gaming device (or a specified group of gaming devices) may be averaged over a specified time period or time interval (e.g., 90 days) to establish a relative baseline of what a "normal" transaction is for that particular gaming device (or group of gaming devices). Any detected financial transactions (new and/or historical) associated with the identified gaming device (or associated with one or more gaming devices of the identified group of gaming device) may then be compared to the baseline "normal" transaction. If, based on the results of the comparison(s), it is determined that an identified transaction exceeds predefined threshold comparison criteria (e.g., greater than 3 sigmas or 3 standard deviations higher than the baseline "normal" transaction), such a determination may trigger in-depth suspicious ML activity analysis of the identified new transaction.

By way of illustration, in one example, a statistical average analysis may be performed for cash-in transactions occurring at an identified gaming device over a 3-month time period. Based on this analysis it may be determined that the baseline "normal" cash-in transaction value and standard deviation value for the identified gaming device is $300, +/−$200. In one embodiment, the $300 value may represent the baseline "normal" cash-in transaction, and the "+/−$200" value may represent one standard deviation. One of the cash-in transactions which occurred during the analyzed 3-month time period relates to a cash-in transaction for $3000. This identified transaction may be determined to be about 13.5× standard deviations higher than the calculated baseline "normal" cash-in transaction for the identified gaming device, which may cause the triggering of in-depth suspicious ML activity analysis to be performed on the identified transaction. Another, (new) cash-in transaction for $1800 is detected at the identified gaming device. This newly identified transaction may be determined to be about 7.5× standard deviations higher than the calculated baseline "normal" cash-in transaction for the identified gaming device, which may cause the triggering of in-depth suspicious ML activity analysis to be performed on the newly identified transaction.

Similarly, in at least one embodiment, a statistical average analysis may be performed for cash-out transactions occurring at an identified gaming device over a 200-day moving time period. Based on this analysis it may be determined that the 200-day moving average, or the baseline "normal" cash-out transaction value and standard deviation value for the identified gaming device is $200, +/−$100. In one embodiment, the $200 value may represent the baseline "normal" cash-out transaction, and the "+/−$100" value may represent one standard deviation. One of the cash-out transactions which occurred during the analyzed 200-day moving time period relates to a cash-out transaction for $2000. This identified transaction may be determined to be about 18× standard deviations higher than the calculated baseline "normal" cash-out transaction for the identified gaming device, which may cause the triggering of in-depth suspicious ML activity analysis to be performed on the identified transaction. Another, (new) cash-out transaction for $800 is detected at the identified gaming device. This newly identified transaction may be determined to be about 6× standard deviations higher than the calculated baseline "normal" cash-out transaction for the identified gaming device, which may cause the triggering of in-depth suspicious ML activity analysis to be performed on the newly identified transaction.

In some embodiments, multiple different types of baseline "normal" transaction values and associated standard deviation values may be calculated for a given gaming device (or given group of gaming devices), which, for example, may be based on analysis of filtered sets of financial transaction data occurring at the identified gaming device (or identified group of gaming devices) over different time periods such as, for example, one or more of the following (or combinations thereof):

Hours
Days
Weeks
Months
Weekdays
Weekends
Holidays
Specified time of day (e.g., financial transactions which occur between 8 pm-2 am)
Specified day(s) of the week (e.g., financial transactions which occur on Fridays and Saturdays)
Specified month(s) of the year (e.g., financial transactions which occur in July and September)

In some embodiments, general trends relating to the fluctuation of baseline "normal" financial transactions over different time periods at a given gaming device (or given group of gaming devices) may be analyzed in order to determine one or more types of baseline "normal" transaction values and corresponding standard deviation values to be associated with the identified gaming device (or identified group of gaming devices).

For example, in some casino environments, it may be observed that the average wager amounts and/or cash-in amounts on Friday nights and Saturday nights are relatively higher than the average wager amounts and/or cash-in amounts on weekday nights. One reason for this may be attributable to the tendency for casinos to increase their minimum wager amounts at table games and/or other gaming devices on Friday nights and Saturday nights. Accordingly, in at least one embodiment, it may be desirable to calculate a separate "Friday-Saturday" baseline "normal" cash-in transaction value and related standard deviation value for an identified gaming device (or identified group of gaming devices). In one embodiment, the "Friday-Saturday" baseline "normal" cash-in transaction value and related standard deviation value may be determined by analyzing a filtered set of cash-in transactions which occur at the identified gaming device (or group of gaming devices) on Fridays and Saturdays over a specified time period (such as, for example, 3 consecutive months). If desired, a separate the "Friday-Saturday night" baseline "normal" cash-in transaction value and related standard deviation value may be determined, for example, by analyzing a filtered set of cash-in transactions which occur at the identified gaming device (or group of gaming devices) on Fridays and Saturdays between the hours of 5 pm and 2 am over a specified time period (such as, for example, the last 100 days).

Non-limiting examples of various types of baseline "normal" transaction criteria and associated standard deviation criteria which may be calculated for a given gaming device (or given group of gaming devices) may include one or more of the following (or combinations thereof):

average 3 month baseline "normal" cash-in transaction and associated standard deviation (time period: 3 consecutive months, transaction filter: all days of week)

average 6 month-weekend baseline "normal" cash-in transaction and associated standard deviation (time period: 6 consecutive months, transaction filter: only Friday and Saturday transactions)

average 12 month-Friday baseline "normal" cash-in transaction and associated standard deviation (time period: 12 consecutive months, transaction filter: only Friday transactions)

average 4 month baseline "normal" cash-out transaction and associated standard deviation (time period: 4 consecutive months, transaction filter: all days of week)

average 100 day-weekend baseline "normal" cash-out transaction and associated standard deviation (time period: last 100 days, transaction filter: only Friday and Saturday transactions)

average 12 month-Friday baseline "normal" cash-out transaction and associated standard deviation (time period: 12 consecutive months, transaction filter: only Friday transactions)

It will be appreciated that the various types of baseline "normal" transaction and standard deviation criteria which may be generated and utilized for triggering of in-depth suspicious ML activity analysis may depend upon the desired types of financial transaction filter criteria to be applied (such as, for example, time period filter criteria, transaction date filter criteria, transaction day of week filter criteria, transaction time filter criteria, etc.). Additionally, in at least some embodiments, the range of acceptable standard deviation variance may also be used as a definable criteria for triggering of in-depth suspicious ML activity analysis. For example, any transactions which have been identified as exceeding 4× standard deviations from the baseline "normal" transaction may be flagged for in-depth suspicious ML activity analysis.

In some embodiments, one or more detected transactions occurring at a given gaming device (or group of gaming devices) may be analyzed and compared against multiple different types of baseline "normal" transaction and standard deviation criteria. For example, in one embodiment, a cash-in transaction for $1500 occurring at a specific gaming device on a Friday evening may be analyzed and compared against each of the following types of baseline "normal" transaction and standard deviation criteria:

average 3 month baseline "normal" cash-in transaction and associated standard deviation (time period: 3 consecutive months, transaction filter: all days of week): $300+/−$200; triggering of in-depth suspicious ML activity analysis occurs for cash-in transactions which exceed 3× standard deviations;

average 6 month-weekend baseline "normal" cash-in transaction and associated standard deviation (time period: 6 consecutive months, transaction filter: only Friday and Saturday transactions): $425+/−$250; triggering of in-depth suspicious ML activity analysis occurs for cash-in transactions which exceed 4× standard deviations;

average 12 month-Friday baseline "normal" cash-in transaction and associated standard deviation (time period: 12 consecutive months, transaction filter: only Friday transactions): $450+/−$225; triggering of in-depth suspicious ML activity analysis occurs for cash-in transactions which exceed 5× standard deviations; In at least one embodiment, the results of the baseline comparison analyses for the identified $1500 cash-in transaction may be as shown below:

i. Results of comparison to average 3 month baseline "normal" cash-in transaction: 6× standard deviation; determined to exceed 3× standard deviation criteria.

ii. Results of comparison to average 6 month-weekend baseline "normal" cash-in transaction: 4.3× standard deviation; determined to exceed 4× standard deviation criteria.

iii. Results of comparison to average 12 month-Friday baseline "normal" cash-in transaction: 4.66× standard deviation; determined not to exceed 5× standard deviation criteria;

In at least one embodiment, if, based on the baseline comparison analyses, the identified $1500 cash-in transaction is determined to exceed standard deviation criteria associated the one or more of the baseline "normal" transaction criteria (which it has, as indicated by the results of (i) and (ii) above), then the identified $1500 cash-in transaction may be flagged for in-depth suspicious ML activity analysis. In other embodiments, the identified $1500 cash-in transaction may be flagged for in-depth suspicious ML activity analysis only if it is determined to exceed standard deviation criteria associated the all (or some specified combination such as, for example, at least two) of the baseline "normal" transaction criteria.

According to different embodiments, the techniques for analyzing selected financial transaction information and determining the various baseline "normal" transaction and standard deviation criteria (e.g., such as those described above with respect to single or individual gaming devices) may similarly be applied to one or more sets or groups of gaming devices. For example, in some embodiments, a statistical average analysis may be performed for cash-in transactions occurring at one or more identified group(s) of gaming devices over a specified time period. Similarly, in some embodiments, a statistical average analysis may be performed for cash-out transactions occurring at one or more identified group(s) of gaming devices over a specified time period.

In some embodiments, various types of pattern recognition techniques may be utilized or employed for identifying suspicious financial transactions which may correspond to one or more different types of money-laundering (ML) activities. Non-limiting examples of pattern recognition techniques may include, but are not limited to, one or more of the following (or combinations thereof):

1) Pattern recognition by location. Example: Group of gaming devices that are within a predefined proximity to each other (e.g., 20-meter proximity), and exhibit similar suspicious ML activities. Location-based analysis may also encompass larger geographical areas such as city, state, region, or even the entire country.

2) Pattern recognition by time. Example Group of gaming devices that exhibit similar suspicious ML activities over a period of time (e.g., 2 hours, weekend, New Year week, and the like).

3) Pattern recognition by transaction types. Example: Group of gaming devices that exhibit high cash-in, follow by minimal gaming activities, and then a cash out transaction.
4) Pattern recognition by the player behavior. Example: A player inserts $2500 cash into a gaming device, just short of a $3000 triggering threshold, plays $100, gets a cash-out voucher, then moves to another gaming device to insert another $2500 cash (not voucher). In this case, in addition to the data uploaded by the gaming device, a sensor such as a security camera mounted in the machine or in the gaming venue may be utilized to recognize the player and/or to identify the player's movement, recognize the player's biometric features, etc.

In some casino gaming environments, such as, for example, those allowing the user of mobile gaming devices, certain types of pattern recognition analysis may be more difficult to perform. For example, pattern recognition by location for mobile gaming devices may be difficult to implement due to the mobility of the device, particularly in casinos where the casino's system is only capable of detecting that the mobile game device is somewhere within a legal gaming location, but is not capable of determining the real-time location of a given mobile gaming device. In such situations, it may be preferable to rely more on the more effective pattern recognition techniques (e.g., pattern recognition by time, pattern recognition by player behavior, and/or pattern recognition by transaction types) and rely less on the less effective pattern recognition techniques.

Additionally, the degree of severity of an identified suspicious activity may also be assessed (e.g., in real-time) in order to determine, for example (i) which type(s) of response action(s) should be performed (e.g., in response to detection of the identified suspicious activity), and/or (ii) the appropriate timeframe for initiating or implementing each response action to be performed.

By way of illustration, non-exhaustive examples of different types of response actions which may be automatically and dynamically initiated or implemented in response to detection of the identified suspicious activity may include, but are not limited to, one or more of the following (or combinations thereof):

Generation and transmission of alert messages to designated recipients such as, for example, the nearest security officers, a casino manager, pit boss, etc. For example, a text message with the details of the suspicious activity may be sent to the nearest security officer's smart phone. In some embodiments, alert messages may be generated and transmitted in real-time or near real-time. In some embodiments, local casino personnel may be timely alerted of suspicious activity. In some embodiments, a GUI representation of the casino floor may also be provided to facilitate casino personnel in quickly identifying the location of suspicious activity.

Generation and transmission of alert messages to local law enforcement.

Generation and transmission suspicious money laundering activity reports. In some embodiments, alert messages may be generated and transmitted in real-time or near real-time.

Electronic filing of suspicious money laundering activity reports with appropriate governing agencies such as, for example FinCEN, law enforcement officers, gaming control board officials, casino security managers, and the like.

Capture image of player (e.g., using casino security camera and/or gaming device camera).

Geolocation capture of suspicious transaction.

Geolocation capture of gaming device involved in suspicious transaction.

Geolocation capture of mobile device(s) associated with one or more persons involved with the identified suspicious activity.

Initiate geotracking (using, for example, WiFi/Cellular/GPS tracking techniques, video analytic surveillance techniques, etc.) of one or more persons involved with the identified suspicious activity. According to different embodiments, one or more video analytic surveillance techniques may be configured or designed to include functionality for performing video surveillance analytics, such as, for example, facial surveillance, advanced object tracking, etc.

Track casino chips in possession by one or more persons involved with the identified suspicious activity.

Delay completion of the transaction (e.g., prolong the transaction time), or hold the transaction processing, pending additional verifications and/or actions.

Etc.

By way of illustration, non-exhaustive examples of different types of criteria may be considered when determining the degree of priority or urgency to be assigned to a given response action may include, but are not limited to, one or more of the following (or combinations thereof):

Time sensitivity. For example, if it is determined that there is a time sensitivity associated with a given response action, then it is preferable that the response action be implemented within an appropriate, predetermined timeframe takes into account the time sensitivity.

Amount of time which has elapsed since the detected event occurred.

Type of suspicious activity involved.

Amount of money involved.

Number of similar incidents within a given period (e.g., 48 hours).

Number of similar incidents within a geographical area (e.g., nearby gaming devices, within the casino gaming venue, within a 2-mile radius, within the city, etc.).

Transactions characteristics and/or transaction patterns that have been flagged or prioritized by law enforcement agencies.

Prior histories of person(s) involved in the suspicious activity. For example, if it is determined that the identity of one of the persons involved in the suspicious activity is a fugitive, it may be desirable to immediately notify law enforcement agencies and/or casino security personnel of the last known location of the identified fugitive.

Increased likelihood of apprehending one or more person(s) involved in the suspicious activity (e.g., if response activity is assigned high priority status).

Increased likelihood of identifying one or more person(s) involved in the suspicious activity (e.g., if response activity is assigned high priority status).

Increased likelihood of prevention of similar type(s) of suspicious activities from occurring in future (e.g., if response activity is assigned high priority status).

Some events may be assigned relatively higher priorities than other events. Assignment of relative priorities may depend upon the particular facts and/or conditions associated with each event. Additionally, in some embodiments, the degree of urgency or priority of dispatching alert(s)

communications and/or notification(s) for a given event may be determined, at least partially, as a function of the priority associated with that event.

For example, detection of a $9000 cash-in event at a specific gaming device, followed by an $8990 cash-out event at the same gaming device within 1 minute may be assigned a high priority, or may be assigned a relatively higher priority than detection of a $9000 cash-in event at the gaming device, followed by an $8990 cash-out event at the same gaming device 2 hours later. In the former situation, it may be determined that there is a relatively high degree of urgency to immediately send out an alert to casino security and the casino floor supervisor, alerting them of the detected ML activity. In the latter situation, it may be determined that there is a relatively lower degree of priority (or no need) for sending out alert(s) communications relating to the detected event. In another example, a cash-out after a Jackpot win of $10,000 is may not be assigned as a high priority event for suspicious ML activity. However, in at least one embodiment, the detection of such an event will trigger a flag for automatic reporting purposes for causing the detected event to be logged and reported to the appropriate agencies for tax reporting purposes.

FIG. 1 illustrates a simplified block diagram of a specific example embodiment of a Gaming Network 100 which may be configured or designed to implement various automated money laundering detection and reporting techniques described and/or referenced herein. As described in greater detail herein, different embodiments of gaming networks may be configured, designed, and/or operable to provide various different types of operations, functionalities, and/or features generally relating to automated money laundering detection and reporting techniques. Further, as described in greater detail herein, many of the various operations, functionalities, and/or features of the Gaming Network(s) and/or Gaming System(s) disclosed herein may provide may enable or provide different types of advantages and/or benefits to different entities interacting with the Gaming Network(s).

According to different embodiments, the Gaming Network 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Gaming Network may include one or more of the following types of systems, components, devices, processes, etc. (or combinations thereof):

Casino Gaming Network(s) 101. In at least one embodiment, the Casino Gaming Network 101 may include or may correspond to one or more gaming network(s), systems, components, devices, etc., which are associated with one or more casino gaming establishments such as, for example, Harrah's Casino (Las Vegas), Caesars Palace (Las Vegas), The Palazzo (Las Vegas), etc. In at least one embodiment, a Casino Gaming Network may be associated with a real-world, physical casino which is located at a particular geographic location. In some embodiments, the Casino Gaming Network may include multiple gaming networks associated with multiple casino gaming establishments at different physical locations (such as, for example, Harrah's Casino Las Vegas, Harrah's Casino New Orleans, Harrah's Casino Atlantic City, etc.).

Internet, Cellular, and WAN Network(s) 103.

3rd Party Systems 190. In at least one embodiment, one or more 3rd Party Systems may include remote server system(s)/service(s), which, for example, may be configured or designed to provide various types of services described and/or referenced herein. In at least one embodiment, one or more 3rd Party Systems may communicate with other components, devices, systems of the Gaming Network via APIs and/or other types of standardized (and/or proprietary) communication protocols. Examples of various types of $3^{rd}$ Party Systems may include, but are not limited to, one or more of the following (or combinations thereof):

Content provider servers/services
Media Streaming servers/services
Database storage/access/query servers/services
Financial transaction servers/services
Payment gateway servers/services
Electronic commerce servers/services
Event management/scheduling servers/services
Automated money laundering detection and reporting services;
Remote Database System(s) which, for example, may be operable to store and provide access to various types of information and data described herein.

Remote Device(s) 170—In at least one embodiment, the Remote Device(s) may be operable to provide administration and customer remote access to other components, devices, systems of the Gaming Network. According to different embodiments, one or more Remote Device may be configured or designed to perform and/or implement various types of functions, operations, actions, and/or other features such as those described or referenced herein (e.g., such as those illustrated and/or described with respect to FIG. 6).

Cloud Services 160—In at least one embodiment, Cloud Services may include a plurality of different public and/or provide computing clouds which, for example, may reside at different physical and/or geographic locations, and which may each be configured or designed to provide different types of services. For example, as illustrated in the example embodiment of FIG. 1, Cloud Services 160 may include functionality for performing and/or implementing ML Analysis, Detection and Reporting Services such as one or more of those described herein.

According to specific embodiments, the at least some of the computing clouds may include several different types of local area networks such as, for example, a backbone LAN which may be utilized for providing localized communication between various local network elements within a given computing cloud, and an internet LAN which, for example, may be utilized for providing WAN or Internet access to various local network elements within the computing cloud. In at least one embodiment, one or more of the computing clouds may be operable to host a variety of different types of applications and/or other software for performing various types of services such as, for example, one or more of those described herein. Additionally, in at least one embodiment, one or more of the computing clouds may be operable to provide various types of database services such as, for example, data storage, database queries, data access, etc. As illustrated in the example embodiment of FIG. 1, cloud services network 160 may include one or more of the following components, devices, and/or systems (or combinations thereof): firewall components 162, load balancer and router components 164, Web services components 166, database components 168, AML detection and reporting components 161.

As illustrated in the example embodiment of FIG. 1, the Casino Gaming Network 101 may include one or more of the following types of systems, components, devices, processes, etc. (or combinations thereof):

Casino Server System(s) 140
Local Administration System(s) 130
Electronic Gaming Machine(s) (EGMs) 110
Gaming Table(s) 120
ATMs/Financial Kiosk(s) 150
Cashier's Cage(s) 180
Network Router(s) 102

Figure 9:
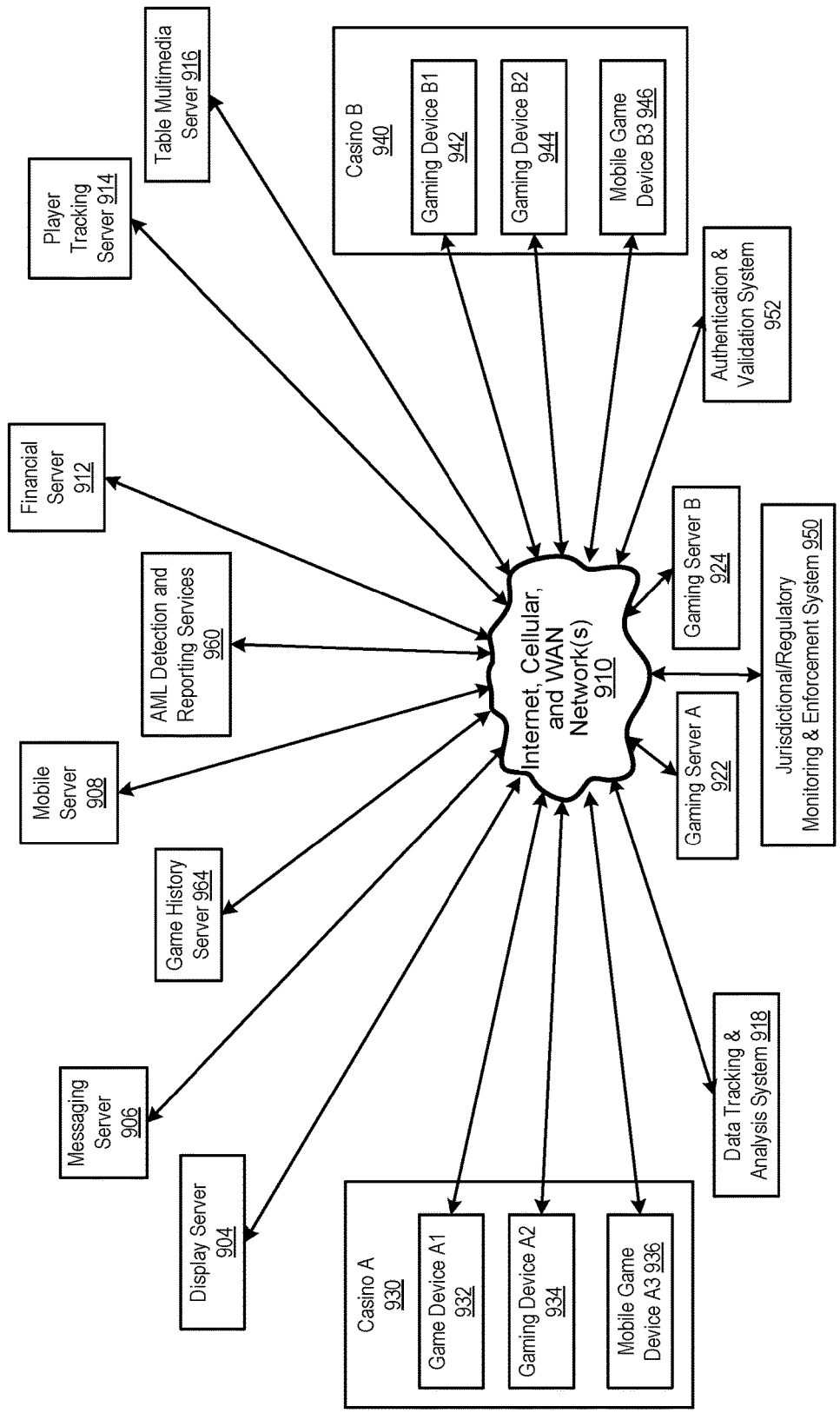
FIG. 9 illustrates an alternate example embodiment of a Gaming Network 900 which may be configured or designed to implement various automated money laundering detection and reporting techniques described and/or referenced herein.

According to different embodiments, the Casino Server System(s) may include various systems, components, and/or devices for facilitating, initiating, and/or performing various operation(s), action(s), feature(s), and/or other functionality, such as, for example, one or more of the following (or combinations thereof):

Display Server System(s) (e.g., 904, FIG. 9). In at least one embodiment, the Display Server System(s) may be configured or designed to implement and/or facilitate management of content (e.g., graphics, images, text, video fees, etc.) to be displayed and/or presented at one or more EGDs (or at one or more groups of EGDs), dealer displays, administrator displays, etc.

Table Multimedia Server System(s) (e.g., 916). In at least one embodiment, the Table Multimedia Server System(s) may be configured or designed to generate, implement and/or facilitate management of content (e.g., graphics, images, text, video fees, audio feeds, etc.), which, for example, is to be streamed or provided to one or more EGDs (or to one or more groups of EGDs).

Messaging Server System(s) (e.g., 906). In at least one embodiment, the Messaging Server System(s) may be configured or designed to implement and/or facilitate management of messaging and/or other communications among and between the various systems, components, devices, EGDs, players, dealers, administrators, and/or other personnel of the gaming network.

Mobile Server System(s) (e.g., 908). In at least one embodiment, the Mobile Server System(s) may be configured or designed to implement and/or facilitate management of communications and/or data exchanged with various types of mobile devices, including for example player-managed mobile devices (e.g., smart phones, PDAs, tablets, mobile computers), casino-managed mobile devices (e.g., mobile gaming devices), etc.

AML Detection and Reporting Service(s) (e.g., 960). In at least one embodiment, the AML Detection and Reporting Service(s) may be configured or designed to include functionality for facilitating, enabling, initiating, and/or performing various types of AML Detection and Reporting operation(s), action(s), and/or feature(s) such as one or more of those described herein.

Financial Server System(s) (e.g., 912). In at least one embodiment, the Financial Server System(s) may be configured or designed to implement and/or facilitate tracking, management, reporting, and storage of financial data and financial transactions relating to one or more wager-based gaming sessions. For example, at least some Financial Server System(s) may be configured or designed to track of the game accounting (money in, money out) for a virtual table game being played, and may also be configured or designed to handle various financial transactions relating to player wagers and payouts. For example, in at least one embodiment, Financial Servers may be configured or designed to monitor each remote player's account information, and may also manage or handle funds transfers between each player's account and the active game server (e.g., associated with the player's game session).

Player Tracking Server System(s) (e.g., 914). In at least one embodiment, the Player Tracking Server System(s) may be configured or designed to implement and/or facilitate management and exchange of player tracking information associated with one or more EGDs, gaming sessions, etc. In at least one embodiment, a Player Tracking Server System may include at least one database that tracks each player's hands, wins/losses, bet amounts, player preferences, etc., in the network. In at least one embodiment, the presenting and/or awarding of promotions, bonuses, rewards, achievements, etc., may be based on a player's play patterns, time, games selected, bet amount for each game type, etc. A Player Tracking Server System may also help establish a player's preferences, which assists the casino in their promotional efforts to: award player comps (loyalty points); decide which promotion(s) are appropriate; generate bonuses; etc.

Data Tracking & Analysis System(s) (e.g., 918). In at least one embodiment, the Data Tracking & Analysis System(s) may be configured or designed to implement and/or facilitate management and analysis of game data. For example, in one embodiment the Data Tracking & Analysis System(s) may be configured or designed to aggregate multisite virtual game table trends, local wins, jackpots, etc.

Gaming Server System(s) (922, (e.g., 924). In at least one embodiment, different game servers may be configured or designed to be dedicated to one or more specifically designated type(s) of game(s) (e.g., Baccarat, Black Jack, Poker, Mahjong, Pai-gow, Chess, etc.). Each game server has game logic to host one of more virtual table game sessions. At least some game server(s) may also capable of keeping track of the game accounting (money in, money out, games won, game lost, etc.) for a virtual table game being played, and/or for updating the Financial Servers at the end of each game. The game servers may also operable to generate the virtual table graphics primitives (e.g., game pieces and game states), and may further be operable to update the remote EGDs when a game state change (e.g., new card dealt, player upped the ante, player folds/busts, etc.) has been detected.

Jurisdictional/Regulatory Monitoring & Enforcement System(s) (e.g., 950). In at least one embodiment, the Jurisdictional/Regulatory Monitoring & Enforcement System(s) may be configured or designed to handle tracking, monitoring, reporting, and enforcement of specific regulatory requirements relating to wager-based gameplay activities in one or more jurisdictions.

Authentication & Validation System(s) (e.g., 952). According to different embodiments, the Authentication & Validation System(s) may be configured or designed to determine and/or authenticate the identity of the current player at a given EGD. For example, in one embodiment, the current player may be required to perform a log in process at the EGD in order to access one or more features. Alternatively, the EGD may be adapted to automatically determine the identity of the current player based upon one or more external signals such as, for example, scanning of a barcode of a player tracking card, an RFID tag or badge worn by the current player which provides a wireless signal to the EGD for determining the identity of the current player.

In at least one implementation, various security features may be incorporated into the EGD to prevent unauthorized players from engaging in certain types of activities at the EGD. In some embodiments, the Authentication & Validation System(s) may be configured or designed to authenticate and/or validate various types of hardware and/or software components, such as, for example, hardware/software components residing at a remote EGDs, game play information, wager information, player information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for all purposes.

Game History Server(s) (e.g., 964). In at least one embodiment, the Game History Server(s) may be configured or designed to track all (or selected) game types and game play history for all (or selected) virtual game tables. In at least one embodiment, a Game History Server may be configured or designed to assists the remote players in selecting a table by, for example, displaying the win/loss statistics of the tables selected by the player as potential candidates to participate. In some embodiments, a Game History Server may also assist the casino manager in case of disputes between players and the casino by, for example, providing the ability to "replay" (e.g., by virtually recreating the game events) the game in dispute, step by step, based on previously stored game states.

Database components 142, which, for example, may be configured or designed to include functionality for storing and/or providing access to various types of information, events, and/or conditions such as, for example, one or more of the following (or combinations thereof): historical game-related information, ML information, ML rules, player ID information, gaming device ID information, location maps of gaming devices, casino-related information, historical financial transaction information, and/or other types of information described and/or referenced herein.

Web Services components 146, which, for example, may be configured or designed to include functionality for facilitating, aggregating gaming data, enabling, initiating, and/or performing various types of web-based services and communications.

Cellular (GSM/CDMA) Communication components 148, which, for example, may be configured or designed to include functionality for facilitating, enabling, initiating, and/or performing various types of cellular-based and/or wireless communications such as transporting gaming data to/from the Cloud Services 160.

Data And Transaction Collection components 144, which, for example, may be configured or designed to include functionality for facilitating, enabling, initiating, and/or performing collection of data and transactions (e.g., financial transaction events) occurring at various components and/or devices of the casino gaming network such as, for example, one or more of the following (or combinations thereof): EGM(s), gaming table(s), ATMs, financial kiosks, casino token storage tray(s), cashier cage component(s), wireless gaming devices, end user mobile device(s), remote devices (e.g., 170), etc.

Firewall component(s) 104.

Etc.

According to different embodiments, Electronic Game Device(s) (EGDs) may include one or more of the following (or combinations thereof): mechanical slot machines, electronic slot machines, electronic gaming machines, mobile gaming devices, video gaming machines, server-based gaming machines, and/or other types of devices or components which provide capabilities for enabling casino patrons to participate in gaming and/or wagering activities. In some embodiments, at least some mobile gaming devices may be implemented using personal mobile computing devices such as tablets, smartphones, laptops, PC's, and the like. As illustrated in the example embodiment of FIG. 1, one or more EGDs may be configured or designed to include one or more of the following components (or combinations thereof): at least one master gaming controller (MGC) 111, communication components 112, printer components 114, Bill/coin acceptor components 116, sensor components 118, data collection and reporting components 113. Additional EGD features and functionalities are illustrated and described with respect to FIGS. 4-6.

According to different embodiments, Gaming Tables(s) may include one or more of the following (or combinations thereof): traditional casino gaming tables (e.g., craps, baccarat at, blackjack, roulette, etc.), electronic gaming tables, server-based gaming tables, and/or other types of devices or components which provide capabilities for enabling two or more casino patrons to concurrently participate in gaming and/or wagering activities. As illustrated in the example embodiment of FIG. 1, one or more gaming tables may be configured or designed to include one or more of the following components (or combinations thereof): at least one master gaming controller (MGC) 121, communication components 122, printer components 124, Bill/voucher/coin acceptor components 126, sensor components 128, data collection and reporting components 123. In at least one embodiment data collection and reporting components 123 may include functionality for facilitating, enabling, initiating, and/or performing collection and reporting of game-related information and/or wager-related information (e.g., including financial transaction events) occurring at that gaming table. Additional gaming table features and functionalities are illustrated and described with respect to FIG. 3.

In at least one embodiment data collection and reporting components (e.g., 113, 123, 153, 183) may include functionality for facilitating, aggregating, enabling, initiating, and/or performing collection and reporting of various types of information relating to conditions and/or events occurring at an associated gaming device and/or gaming table game, such as, for example: game-related information, player tracking information, wager-related information (e.g., including financial transaction events), and the like.

In at least one embodiment, Local Administration System 130 may include various types of devices or components (such as, for example, mobile devices 132, tablets 134, computer systems 136, etc.) which provide capabilities for enabling casino administrators to implement or perform administration of one or more aspects, components, systems, operations, and/or activities relating to a casino gaming network (e.g., 101). Additionally, local administrative access can be provided for the casino manager for configuring, registering, monitoring, analyzing, sending alerts, generating reports, etc., relating to ML and suspicious activities.

According to different embodiments, Remote Devices 170 may include various types of devices or components (such as, for example, smart phones 172, tablets 174, computer systems 176, etc.) which provide capabilities for enabling a remote user to remotely participate in gaming and/or wagering activities at a casino gaming network (e.g., 101). In at least one embodiment, one or more remote device components may also be used by remote casino administrators to implement or perform remote administration of one or more aspects, components, systems, operations, and/or activities relating to a casino gaming network (e.g., 101).

In at least one embodiment, the Gaming Network may be operable to utilize and/or generate various different types of data and/or other types of information when performing specific tasks and/or operations. This may include, for example, input data/information and/or output data/information. For example, in at least one embodiment, the Gaming Network may be operable to access, process, and/or otherwise utilize information from one or more different types of sources, such as, for example, one or more local and/or remote memories, devices and/or systems. Additionally, in at least one embodiment, the Gaming Network may be operable to generate one or more different types of output data/information, which, for example, may be stored in memory of one or more local and/or remote devices and/or systems. Examples of different types of input data/information and/or output data/information which may be accessed and/or utilized by the Gaming Network may include, but are not limited to, one or more of those described and/or referenced herein. According to specific embodiments, multiple instances or threads of the Gaming Network processes and/or procedures may be concurrently implemented and/or initiated via the use of one or more processors and/or other combinations of hardware and/or hardware and software.

According to different embodiments, various different types of encryption/decryption techniques may be used to facilitate secure communications between devices, systems, and/or components of the Gaming Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

It will be appreciated that the Gaming Network of FIG. 1 is but one example from a wide range of Gaming Network embodiments which may be implemented. Other embodiments of the Gaming Network (not shown) may include additional, fewer and/or different components/features that those illustrated in the example Gaming Network embodiment of FIG. 1.

Generally, the automated money laundering detection and reporting techniques described herein may be implemented in hardware and/or hardware+software. Hardware and/or software+hardware hybrid embodiments of the automated money laundering detection and reporting techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

FIG. 9 illustrates an alternate example embodiment of a Gaming Network 900 which may be configured or designed to implement various automated money laundering detection and reporting techniques described and/or referenced herein. As described in greater detail herein, different embodiments of Gaming Networks may be configured, designed, and/or operable to provide various different types of operations, functionalities, and/or features generally relating to Gaming Network technology. Further, as described in greater detail herein, many of the various operations, functionalities, and/or features of the Gaming Network(s) and/or Gaming System(s) disclosed herein may provide may enable or provide different types of advantages and/or benefits to different entities interacting with the Gaming Network(s).

According to different embodiments, the Gaming Network 900 may include a plurality of different types of components, devices, modules, processes, systems, etc., which, for example, may be implemented and/or instantiated via the use of hardware and/or combinations of hardware and software. For example, as illustrated in the example embodiment of FIG. 9, the Gaming Network may include one or more of the following types of systems, components, devices, processes, etc. (or combinations thereof):

Display Server System(s) 904. Table Multimedia Server System(s) 916.
    Messaging Server System(s) 906.
    Mobile Server System(s) 908.
    AML Detection and Reporting Services 960.
    Financial Server System(s) 912.
    Player Tracking Server System(s) 914.
    Data Tracking & Analysis System(s) 918.
    Gaming Server System(s) (922, 924).
    Jurisdictional/Regulatory Monitoring & Enforcement System(s) 950.
    Authentication & Validation System(s) 952.
    Casino Venues (930, 940).
    Electronic Game Devices (EGDs) 932, 934, 936, 942, 944, 946.
    Internet, Cellular, and WAN Network(s) 910.
    Game History Server(s) 964.
    Remote Database System(s).
    Remote Server System(s)/Service(s).
    Mobile Device(s).
    Etc.

The functionality of the various systems and components of FIG. 9 may be similar to those described previously with respect to the description of FIG. 1, and therefore need not be repeated.

Figure 2:
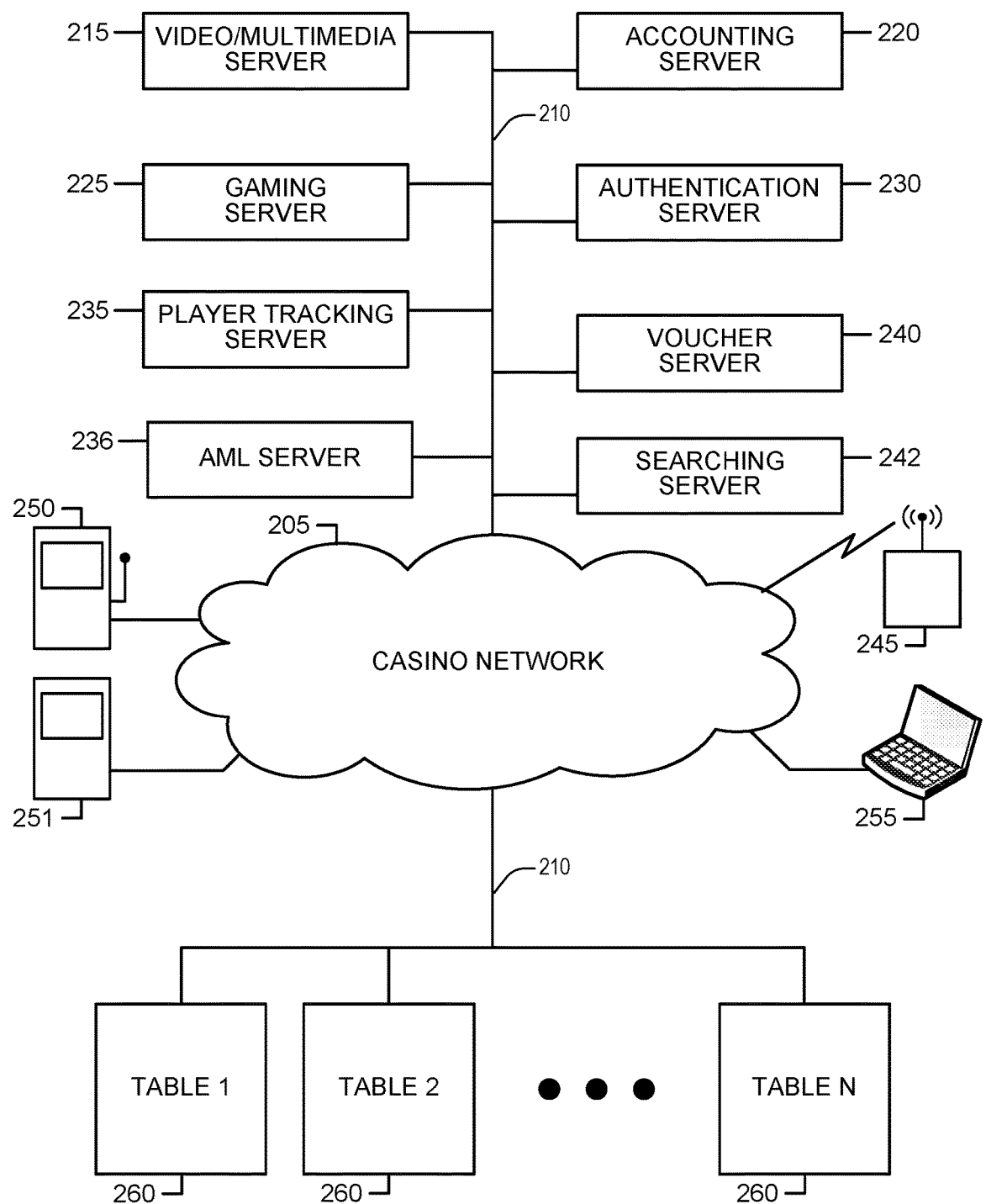
FIG. 2 shows an example block diagram of an electronic gaming system 200 in accordance with a specific embodiment.

FIG. 2 shows an example block diagram of an electronic gaming system 200 in accordance with a specific embodiment. Electronic gaming system 200 may include electronic gaming tables 260, which may be coupled to network 205 via a network link 210. Electronic gaming tables 260 may be normal gaming tables with enhanced electronic capabilities. Network 205 may be the internet or a private network. One or more video streams may be received at video/multimedia server 215 from gaming tables 260. Video/Multimedia server 215 may transmit one or more of these video streams to a mobile device 245, a gaming device 250, an EGD 251, a laptop 255, and/or any other remote electronic device. Video/Multimedia server 215 may transmit these video streams via network link 210 and network 205.

Electronic gaming system 200 may include an accounting/transaction server 220, a gaming server 225, an authentication server 230, a player tracking server 235, a voucher server 240, and a searching server 242.

Accounting/transaction server 220 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. Accounting/transaction server 220 may generate tax information relating to these wagers. Accounting/transaction server 220 may generate profit/loss reports for predetermined gaming options, contingent gaming options, predetermined betting structures, and/or outcome categories.

Gaming server 225 may generate gaming options based on predetermined betting structures and/or outcome categories. These gaming options may be predetermined gaming options, contingent gaming options, and/or any other gaming option disclosed in this disclosure.

Authentication server 230 may determine the validity of vouchers, players' identity, and/or an outcome for a gaming event.

Player tracking server 235 may track a player's betting activity, a player's preferences (e.g., language, drinks, font, sound level, etc.). Based on data obtained by player tracking server 235, a player may be eligible for gaming rewards (e.g. free play), promotions, and/or other awards (e.g., complimentary food, drinks, lodging, concerts, etc.).

Voucher server 240 may generate a voucher, which may include data relating to gaming options. For example, data relating to the structure (e.g., 6 out of the next 10 rolls at craps table 4 will be a 7 or 11) may be generated. If there is a time deadline, that information may be generated by voucher server 240. Vouchers may be physical (e.g., paper) or digital.

AML Server 236 may be configured or designed to include functionality for facilitating, enabling, initiating, and/or performing various AML analysis, detection, and/or reporting activities, operation(s), action(s), and/or feature(s) such as one or more of those described herein.

Searching server 242 may implement a search on one or more gaming devices to obtain gaming data. Searching server 242 may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching server 242 may implement a wagering function, which may be an automatic wagering mechanism. These functions of searching server 242 may be integrated into one or more servers.

Searching server 242 may include one or more searching structures, one or more searching algorithms, and/or any other searching mechanisms. In general, the search structures may cover which table games paid out the most money during a time period, which table games kept the most money from players during a time period, which table games are most popular (top games), which table games are least popular, which table games have the most amount of money wager during a period, which table games have the highest wager volume, which table games are more volatile (volatility, or deviation from the statistical norms, of wager volume, wager amount, pay out, etc.) during a time period, and the like. Search may also be associated with location queries, time queries, and/or people queries (e.g., where are the table games that most of my friends wager on, where are my favorite dealers, what do players wager on the most today, when are most wagers placed, etc.).

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., baccarat tables, roulette tables, blackjack tables, poker tables, craps tables, Sic Bo tables, etc.). Searching structure may search one or more of these games.

In another example, the searching structure may be based on a player's preferences, past transactional history, player input, a particular table, a particular game, a particular dealer, a particular casino, a particular location within a casino, game outcomes over a time period, payout over a time period, and/or any other criteria.

Searching algorithms may be dynamic searching programs, which may be modified based on one or more past results. For example, a search algorithm may be based on searching blackjack tables. The search algorithm may initially search blackjack tables 1-10 to determine whether any triggering events have occurred. Based on one or more previous searches, the search algorithm may determine: (1) that blackjack tables 1-4 are only opened from 7 pm to 3 am; (2) that blackjack tables 5-7 are opened twenty-four hours a day; and (3) that blackjack tables 8-10 are only opened from 7 am to 5 pm. The search algorithm may then modify the search parameters utilized based on this data. For example, if the search algorithm is initiated at 6 pm to determine blackjack triggering events, then the search algorithm may only search blackjack tables 5-7 because these blackjack tables are the only blackjack tables operating at that specific time.

Figure 3:
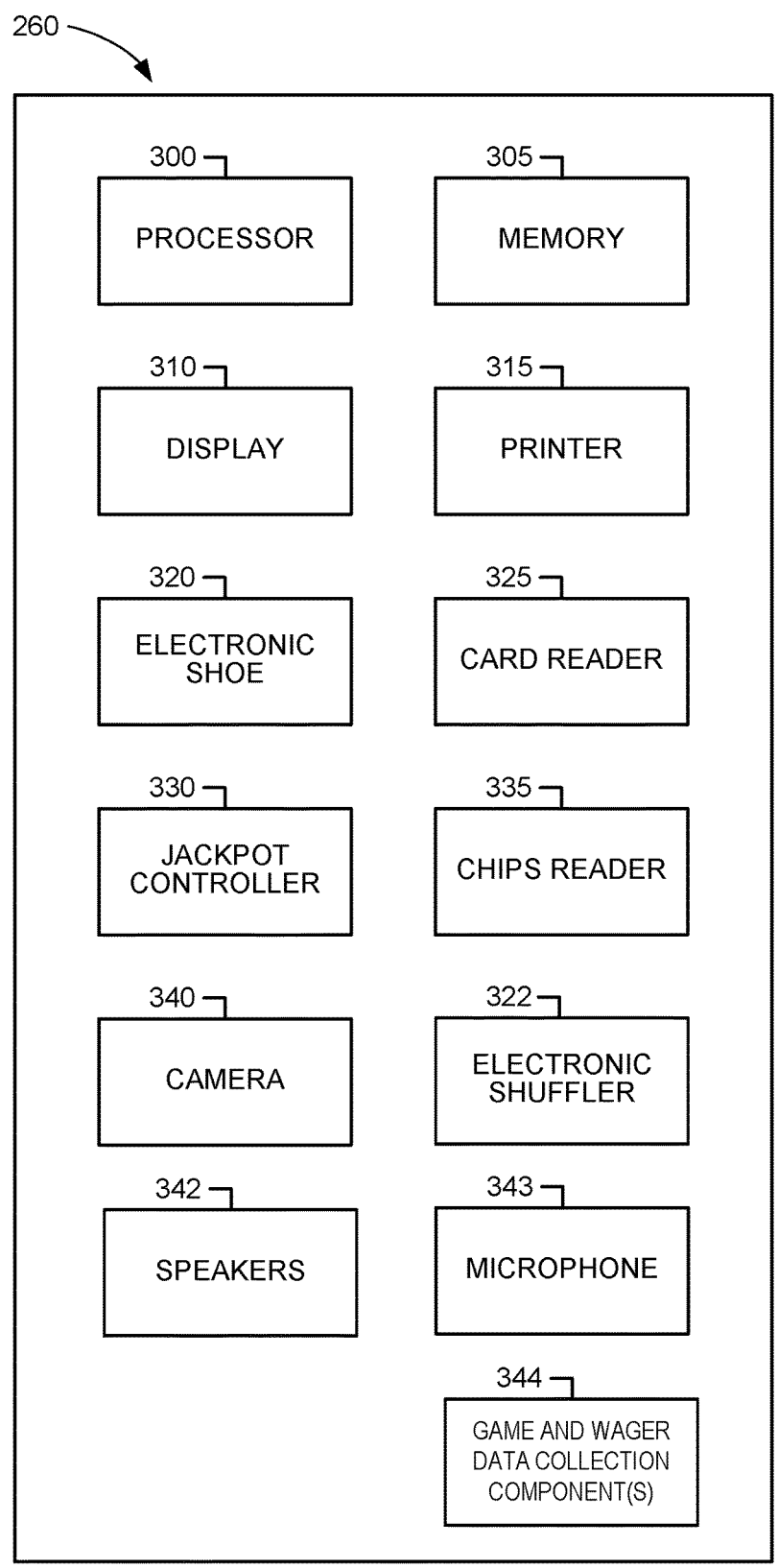
FIG. 3 shows electronic gaming table 260 with various features, in accordance with a specific embodiment.

In another example, the search algorithm may determine that a specific triggering event occurs with a ninety percent success rate on a first table, a ten percent success rate on a second table, a fifty percent success rate on a third table, and a seventy percent success rate on a fourth table. The search algorithm may generate a search priority based on the probability of success, which may lead to the first table being searched first, the fourth table being searched second, the third table being searched third, and the second table being searched fourth. Search algorithm may utilize any dynamic feedback procedure to enhance current and/or future searching results FIG. 3 shows electronic gaming table 260 with various features, in accordance with a specific embodiment. Various different embodiments of the electronic gaming table 260 may be used as a live game table for conducting gameplay relating to one or more gaming sessions.

Electronic gaming table 260 may include a processor 300, a memory 305, a display 310, a printer 315, an electronic shoe 320, an electronic shuffler 322, a smart card reader 325, a jackpot controller 330, a chips reader 335, and a camera 340.

Processor 300 may be communicatively coupled to any other device in electronic gaming table 260. Processor 300 via an interface may communicate wired or wireless, with any of the elements of electronic gaming device 100 and/or electronic gaming system 200.

Memory 305 may include data relating to gaming events, video streams transmitted from electronic gaming table 260, winning and losing percentages for gaming options relating to electronic gaming table 260, and game management data (e.g., dealer schedule, chip refills, etc.).

Display 310 may show previous game results, a betting structure, outstanding wagers, transaction volume, present value of betting options, a table minimum wager, a table maximum wager, wager and/or game play instructions input by one or more remote players (e.g., via their respective EGDs), instructions to the live dealer/attendant relating to game play activities to be performed by the dealer/attendant, video data, and/or any other type of data or content.

Printer 315 may generate vouchers, promotional items, food tickets, event tickets, and/or lodging tickets. Vouchers may be physical (e.g., paper) or digital.

Electronic shuffler 322 may be configured or designed to automatically shuffle multiple decks of cards, and to track the relative order of each of the cards of the shuffled decks of cards. The electronic shuffler can include an off the shelf unit. A dealer can use the electronic shuffler to shuffle the decks of cards before dealing the required hands, and place the shuffled decks of cards into the electronic shoe 320. In this way, the electronic gaming table may determine the relative order of all cards in the card shoe at the start of one or more game session(s), and/or at all other times of game play.

Electronic shoe 320 may obtain data and/or images of gaming objects utilized with gaming table 260. This data and/or images may be transmitted to electronic gaming device and displayed as images from table games. For example, on a blackjack table a ten of spades may be dealt to a player. This information is obtained via electronic shoe 320 and utilized to generate an image and/or illustration of a ten of spades card on an electronic gaming device. In another example, electronic shoe 320 may receive data relating to the numbers on dice, transmit this data to electronic gaming device, which may be utilized to generate an image/illustration of the dice on electronic gaming device.

In at least one embodiment, the electronic shoe can include an electronic reading system, such as an optical reader for recognizing the face value of each card. The electronic shoe can be designed to communicate directly with the card dealing/shuffling system to read or otherwise obtain the value of each card being dealt by the dealer as the card leaves the card dealing/shuffling system. For example, an optical reader or similar device can be attached to the card dealing/shuffling system, and the electronic shoe can obtain the scanned value of cards in the card dealing/shuffling system. In some implementations, the electronic shoe can interface with the table to read the value of each card being dealt by the dealer. For example, the table can include one or more scanning interfaces to scan each card before or after the card is dealt by the dealer. The electronic shoe can communicate with the one or more scanning interfaces to obtain the value of each card before or after the card is dealt by the dealer.

Card reader 325 may provide identification, authentication, and application processing functions. Card reader 325 may interface with smart cards, magnetic striped card, bar code reader, RFID card, and the like.

Jackpot controller 330 may track and compile data associated with a jackpot. Jackpot controller 330 may award the jackpot on a specific occurrence (e.g., blackjack event, dealing a royal flush, etc.) and/or randomly award a jackpot.

Chips reader 335 may compile and track data associated with the amount of chips one or more players possesses, the amount of chips won/lost at gaming table 260, the amount of chips in the dealer's rack at gaming table 260, an amount of chips wager by one or more players, amount of chips in the betting pool, and/or any combination thereof.

Camera 340 may obtain data from gaming table 260. Camera 340 may be one or more cameras located to view the gaming objects (e.g., cards, dice, dominos, ball, wheel, etc.), the dealer, the shoe, the players' hands, the players, and/or any combination thereof. Camera 340 may transmit this data to gaming table, which may be utilized to generate an image/illustration of the gaming objects.

Speakers 342 may be used to provide audio information to the game table dealer/attendant. Examples of different types of audio information may include, for example, audio instructions and/or other audio/verbal communications from one or more remote players, computer-generated audio instructions/content, sound effects, and/or other types of audio content.

Microphone 343 may be used to capture, record, and/or stream audio information from the electronic gaming table region, which, for example, may include verbal communications from the table game dealer/attendant.

Game And Wager Data Collection Component(s) 344 may include functionality for facilitating, enabling, initiating, and/or performing collection and reporting of various types of information relating to conditions and/or events occurring at an associated gaming device and/or gaming table game, such as, for example game-related information, player tracking information, wager-related information (e.g., including financial transaction events), and/or other types of data/information described and/or referenced herein.

According to specific embodiments, a variety of different game states may be used to characterize the state of current and/or past events which are occurring (or have occurred) at a given live gaming table. For example, in one embodiment, at any given time in a game, a valid current game state may be used to characterize the state of game play (and/or other related events, such as, for example, mode of operation of the gaming table, etc.) at that particular time. In at least one embodiment, multiple different states may be used to characterize different states or events which occur at the gaming table at any given time. In one embodiment, when faced with ambiguity of game state, a single state embodiment forces a decision such that one valid current game state is chosen. In a multiple state embodiment, multiple possible game states may exist simultaneously at any given time in a game, and at the end of the game or at any point in the middle of the game, the gaming table may analyze the different game states and select one of them based on certain criteria. Thus, for example, when faced with ambiguity of game state, the multiple state embodiment(s) allow all potential game states to exist and move forward, thus deferring the decision of choosing one game state to a later point in the game. The multiple game state embodiment(s) may also be more effective in handling ambiguous data or game state scenarios.

According to specific embodiments, a variety of different entities may be used (e.g., either singly or in combination) to track the progress of game states which occur at a given gaming table. Examples of such entities may include, but are not limited to, one or more of the following (or combination thereof): master controller system, display system, gaming system, local game tracking component(s), remote game tracking component(s), etc. Examples of various game tracking components may include, but are not limited to: automated sensors, manually operated sensors, video cameras, intelligent playing card shoes, RFID readers/writers, RFID tagged chips, objects displaying machine readable code/patterns, etc.

According to a specific embodiment, local game tracking components at the gaming table may be operable to automatically monitor game play activities at the gaming table, and/or to automatically identify key events which may trigger a transition of game state from one state to another as a game progresses. For example, in the case of Blackjack, a key event may include one or more events which indicate a change in the state of a game such as, for example; a new card being added to a card hand, the split of a card hand, a card hand being moved, a new card provided from a shoe, removal or disappearance of a card by occlusion, etc.

Figure 4:
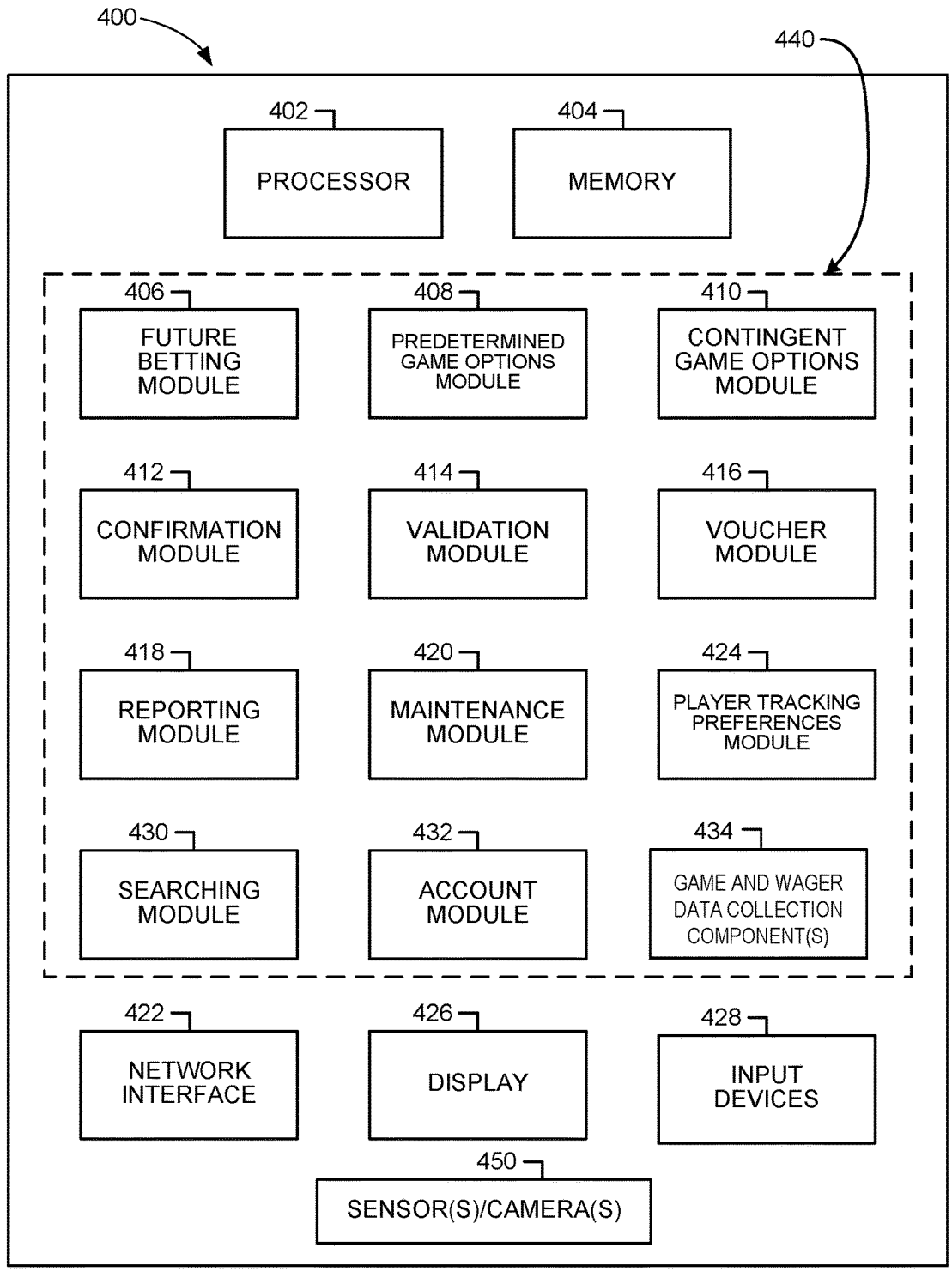
FIG. 4 shows a block diagram 400 of electronic gaming device 400, in accordance with a specific embodiment.

FIG. 4 shows a block diagram 400 of electronic gaming device 400, in accordance with a specific embodiment. Electronic gaming device 400 may include a processor 402, a memory 404, a network interface 422, input devices 428, and a display 426.

Processor 402 may generate gaming options based on predetermined betting structures and/or outcome categories. As previously discussed in the craps example above, predetermined betting structures may include outcome categories. In that example, there were three outcome categories (e.g., outcome equaling a seven, outcome not equaling a hard number, and outcome not equaling a craps). Predetermined betting structures may utilize one outcome category (e.g., win, lose, hard number, craps, etc.) to generate via processor 402 gaming options. Predetermined betting structures may utilize more than one outcome category to generate via processor 402 gaming options. Predetermined betting structures may combine any outcome category with any other outcome category to gaming options.

Processor 402 may offer a gaming option which is structured so that the gaming option relates to more than one gaming table. The gaming option structure may be that for the next five baccarat games (e.g., games numbered 1010 to 1014) the dealer will win three of these five games and three of the next five roulette games (e.g., games numbered 900 to 904) red will be the winning spot.

Processor 402 may generate contingent gaming options 108 and/or predetermined gaming options 106. Contingent gaming options 108 may be structures such that when a triggering event occurs over one or more than one gaming event, racing event, and/or sporting event, the wager is activated.

Network interface 422 may allow electronic gaming device 400 to communicate with video/multimedia server 215, accounting/transaction server 220, gaming server 225, authentication server 230, player tracking server 235, voucher server 240, and gaming table 260.

Input devices 428 may be mechanical buttons, electronic buttons, a touchscreen, a microphone, cameras, an optical scanner, or any combination thereof. Input devices 428 may be utilized to make a wager, to make an offer to buy or sell a voucher, to determine a voucher's worth, to cash in a voucher, to modify (e.g., change sound level, configuration, font, language, etc.) electronic gaming device 400, to select a movie or music, to select live video streams (e.g., table 1, table 2, table 3), to request services (e.g., drinks, manager, etc.), or any combination thereof.

Display 426 may show video streams from one or more gaming tables 260, gaming objects from one or more gaming tables 260, computer generated graphics, predetermined gaming options 106, and/or contingent gaming options 108.

Memory 404 may include various memory modules 440. Memory 404 via various memory modules 440 may include a future betting module 406, a predetermined game options module 408, a contingent game options module 410, a confirmation module 412, a validation module 414, a voucher module 416, a reporting module 418, a maintenance module 420, a player tracking preferences module 424, a searching module 430, and an account module 432.

Future betting module 406 may store data relating to the predetermined betting structure. Processor 402 may utilize data in future betting module 406 to generate predetermined gaming options 106 and contingent gaming options 108. Any other processor (e.g., gaming server 225, any virtualized gaming server, etc.) may implement these functions of processor 402.

Predetermined game options module 408 may store data relating to predetermined gaming options 106, which may be offered to a player.

Contingent game options module 410 may store data relating to continent gaming options 108, which may be offered to a player.

Confirmation module 412 may utilize data received from a voucher, the transaction history of the voucher (e.g., the voucher changed hands in a secondary market), and/or the identity of the player to confirm the value of the voucher. In another example, confirmation module 412 may utilize game event data, along with voucher data to confirm the value of the voucher.

Validation module 414 may utilize data received from a voucher to confirm the validity of the voucher.

Voucher module 416 may store data relating to generated vouchers, redeemed vouchers, bought vouchers, and/or sold vouchers.

Game And Wager Data Collection Component(s) 434 may include functionality for facilitating, enabling, initiating, and/or performing collection and reporting of various types of information relating to conditions and/or events occurring at an associated gaming device and/or gaming table game, such as, for example game-related information, player tracking information, wager-related information (e.g., including financial transaction events), and/or other types of data/information described and/or referenced herein.

Sensor(s)/Camera(s) 450 may be configured or designed to detect and capture external data, events, and/or conditions including, for example, biometric information (e.g., facial images, facial features, fingerprints, voice recordings, etc.) relating to the player(s) or user(s) interacting with the gaming device. In some embodiments, the camera and/or other sensor(s) of the electronic gaming device may be remotely controlled and actuated. For example, in one embodiment, if it is determined that suspicious ML activities may be occurring at a given electronic gaming device, the camera of the electronic gaming device may be caused to be remotely actuated in order to capture a facial image of the person(s) who is/are interacting with the electronic gaming device.

Reporting module 418 may generate reports related to a performance of electronic gaming device 400, electronic gaming system 200, table game 260, video streams, gaming objects, credit device 112, and/or identification device 114.

In one implementation, reporting module 418 may reside on a central server and can aggregate and generate real time statistics on betting activities at one or more table games at one or more participating casino's. The aggregate betting statistics may include trends (e.g., aggregate daily wager volume and wager amount by game types, by casinos, and the like), top games with the most payouts, top tables with the most payouts, top search structures used by players, most popular dealers by wager volume, most searched for game, tables with least payouts, weekly trends, monthly trends, and other statistics related to game plays, wagers, people, location, and searches.

The information and statistics generated by the server-based reporting module 418 can be displayed publicly or privately. For example, popular trending and statistical information on wager volume and wager amount for the top ten table games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Maintenance module 420 may track any maintenance that is implemented on electronic gaming device 400 and/or electronic gaming system 200. Maintenance module 420 may schedule preventative maintenance and/or request a service call based on a device error.

Player tracking preferences module 424 may compile and track data associated with a players preferences.

Searching module 430 may include one or more searching structures, one or more searching algorithms, and/or any other searching mechanisms. The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., baccarat tables, roulette tables, blackjack tables, poker tables, craps tables, Sic Bo tables, etc.). Searching structure may search one or more of these games.

In another example, the searching structure may be based on a player's preferences, past transactional history, player input, a particular table, a particular game, a particular dealer, a particular casino, a particular location within a casino, game outcomes over a time period, payout over a time period, and/or any other criteria. Searching algorithms may be dynamic searching programs, which may be modified based on one or more past results, as described previously.

In another example, the search algorithm may generate a search priority based on the probability of success various events and/or conditions, as described previously. In some embodiments, the search algorithm may utilize any dynamic feedback procedure to enhance current and/or future searching results.

Account module 432 may include data relating to an account balance, a wager limit, a number of wagers placed, credit limits, any other player information, and/or any other account information.

Data from account module 432 may be utilized to determine whether a wager may be accepted. For example, when a search has determined a triggering event, the device and/or system may determine whether to allow this wager based on one or more of a wager amount, a number of wagers, a wager limit, an account balance, and/or any other criteria.

For example, the system and/or device determines via searching function that a triggering event has occurred. Based on this triggering event, the player would like to make a $400 wager, however, the player's account balance is only $50. In this case, the system and/or device may not accept the wager, modify the wager to the account balance (e.g., $50), send a notice to the player, modify the wager to some percentage (e.g., 10%, 25%, 50%, 75%, etc.) of the account balance (e.g., $5, $12.50, $25, $37.5, etc.), send a notice to the gaming entity, make a flat wager (e.g., $10), and/or any combination thereof.

In another example, the system and/or device determines via searching function that a triggering event has occurred. Based on this triggering event, the player would like to make a $400 wager and the player's account balance is $150. However, the system and/or device may not accept the wager because one betting parameter may be that no one wager may be more than a certain percentage (e.g., fifty percent) of a player's account balance. In this case, the system and/or device may not accept the wager, modify the wager to the predetermined limit (e.g., $75), send a notice to the player, modify the wager to some other percentage (e.g., 5%, 10%, 25%, 40%, etc.) of the account balance, send a notice to the gaming entity, make a flat wager (e.g., $10), and/or any combination thereof.

In another example, the gaming jurisdiction, the casino, the system and/or device may not allow an individual to place a wager over a specific value (e.g., $25, $400, $1,000, $10,000, $400,000, $1,000,000, etc.).

In another example, the system and/or device may not allow an individual to lose more than a specific amount of money in a predetermined timeframe. An individual may only be allowed to lose $200 (or any other number) over a two hour period (or any other time period).

In another example, based on this triggering event, the player would like to make a $400 wager and the player has a $200 balance. However, the player has made a predetermined number of wagers within a predetermined time frame. For example, the system and/or device may not allow an individual to make more than 5 wagers a day, 25 wagers a week, 1,000 wagers a year, etc.

Any of these betting parameters may be combined by the system and/or device.

In at least one embodiment, at least a portion of the modules discussed in block diagram 400 may reside locally in gaming terminal 400. However, In at least some embodiments, the functions performed by these modules may be implemented in one or more remote servers. For instance, modules 406-420 and 424 may each be on a remote server, communicating with gaming terminal 400 via a network interface such as Ethernet in a local or a wide area network topology. In some implementations, these servers may be physical servers in a data center. In some other implementations, these servers may be virtualized. In yet some other implementations, the functions performed by these modules may be implemented as web services. For example, the predetermined game options module 408 may be implemented in software as a web service provider. Gaming terminal 400 would make service requests over the web for the available predetermined wager options to be displayed. Regardless of how the modules and their respective functions are implemented, the interoperability with the gaming terminal 400 is seamless.

In one implementation, reporting module 418 may reside on a central server and can aggregate and generate real time statistics on betting activities at one or more table games at one or more participating casino's. The aggregate betting statistics may include trends (e.g., aggregate daily wager volume and wager amount by game types, by casinos, and the like), top games with the most payouts, top tables with the most payouts, top search structures used by players, most popular dealers by wager volume, most searched for game, tables with least payouts, weekly trends, monthly trends, and other statistics related to game plays, wagers, people, location, and searches.

The information and statistics generated by the server-based reporting module 418 can be displayed publicly or privately. For example, popular trending and statistical information on wager volume and wager amount for the top ten table games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Figure 5:
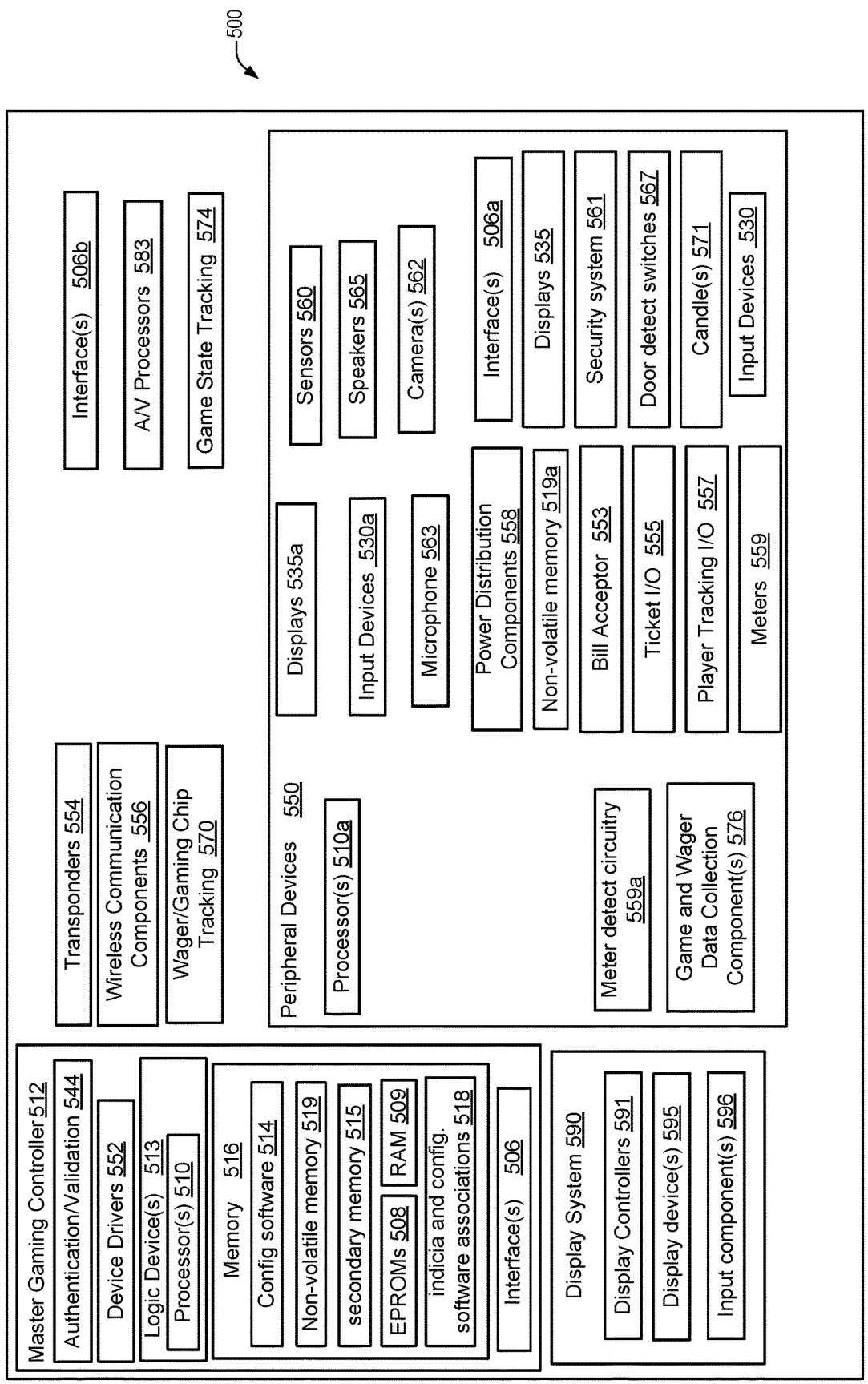
FIG. 5 is a simplified block diagram of an exemplary intelligent electronic gaming system 500 in accordance with a specific embodiment.

FIG. 5 is a simplified block diagram of an exemplary intelligent multi-player electronic gaming system 500 in accordance with a specific embodiment. In some embodiments, gaming system by hundred may be implemented as a gaming server. In other embodiments, gaming system 500 may be implemented as an electronic gaming machine (EGM) or electronic gaming device (EGD).

As illustrated in the embodiment of FIG. 5, gaming system 500 includes at least one processor 510, at least one interface 506, and memory 516. Additionally, as illustrated in the example embodiment of FIG. 5, gaming system 500 includes at least one master gaming controller 512, a multi-touch sensor and display system 590, a plurality of peripheral device components 550, and various other components, devices, systems such as, for example, one or more of the following (or combinations thereof):

- Transponders 554;
- Wireless communication components 556;
- Gaming chip/wager token tracking components 570;
- Games state tracking components 574;
- Audio/video processors 583 which, for example, may include functionality for detecting, analyzing and/or managing various types of audio and/or video information relating to various activities at the gaming system;
- Various interfaces 506 (e.g., for communicating with other devices, components, systems, etc.);
- Sensors 560;
- One or more cameras 562;
- One or more microphones 563;
- Input devices 530a;
- Peripheral Devices 550;
- Game and Wager Data Collection Component(s) 576

One or more cameras (e.g., 562) may be used to monitor, stream and/or record image content and/or video content relating to persons or objects within each camera's view. For example, in at least one embodiment where the gaming system is implemented as an EGD, camera 562 may be used to generate a live, real-time video feed of a player (or other person) who is currently interacting with the EGD. In some embodiments, camera 562 may be used to verify a user's identity (e.g., by authenticating detected facial features), and/or may be used to monitor or tract facial expressions and/or eye movements of a user or player who is interacting with the gaming system.

In at least one embodiment, display system 590 may include one or more of the following (or combinations thereof):

- Display controllers 591;
- Multipoint sensing device(s) (e.g., multi-touch surface sensors/components);
- Display device(s) 595;
- Input/touch surface 596;
- Etc.

According to various embodiments, display device(s) 595 may include one or more display screens utilizing various types of display technologies such as, for example, one or more of the following (or combinations thereof): LCDs (Liquid Crystal Display), Plasma, OLEDs (Organic Light Emitting Display), TOLED (Transparent Organic Light Emitting Display), Flexible (F)OLEDs, Active matrix (AM) OLED, Passive matrix (PM) OLED, Phosphorescent (PH) OLEDs, SEDs (surface-conduction electron-emitter display), EPD (ElectroPhoretic display), FEDs (Field Emission Displays) and/or other suitable display technology. EPD displays may be provided by E-ink of Cambridge, Mass. OLED displays of the type list above may be provided by Universal Display Corporation, Ewing, N.J.

In at least one embodiment, master gaming controller 512 may include one or more of the following (or combinations thereof):

- Authentication/validation components 544;
- Device drivers 542;
- Logic devices 513, which may include one or more processors 510;
- Memory 516, which may include one or more of the following (or combinations thereof): configuration software 514, non-volatile memory 515, EPROMS 508, RAM 509, associations 518 between indicia and configuration software, etc.;
- Interfaces 506;
- Etc.

In at least one embodiment, Peripheral Devices 550 may include one or more of the following (or combinations thereof):

- Power distribution components 558;
- Non-volatile memory 519a (and/or other types of memory);
- Bill acceptor 553;
- Ticket I/O 555;
- Player tracking I/O 557;
- Meters 559 (e.g., hard and/or soft meters);
- Meter detect circuitry 559a;
- Processor(s) 510a;
- Interface(s) 506a;
- Display(s) 535;
- Security system 561;
- Door detect switches 567;
- Input devices 530;
- Etc.

In one implementation, processor 510 and master gaming controller 512 are included in a logic device 513 enclosed in a logic device housing. The processor 510 may include any conventional processor or logic device configured to execute software allowing various configuration and reconfiguration tasks such as, for example: a) communicating with a remote source via communication interface 506, such as a server that stores authentication information or games; b) converting signals read by an interface to a format corresponding to that used by software or memory in the gaming system; c) accessing memory to configure or reconfigure game parameters in the memory according to indicia read from the device; d) communicating with interfaces, various peripheral devices and/or I/O devices; e) operating peripheral devices such as, for example, card readers, paper ticket readers, etc.; f) operating various I/O devices such as, for example, displays 535, input devices 530; etc. For instance, the processor 510 may send messages including game play information to the displays 535 to inform players of cards dealt, wagering information, and/or other desired information.

In at least one implementation, the gaming system may include card readers such as used with credit cards, or other identification code reading devices to allow or require player identification in connection with play of the card game and associated recording of game action. Such a player identification interface can be implemented in the form of a variety of magnetic card readers commercially available for reading a player-specific identification information. The player-specific information can be provided on specially constructed magnetic cards issued by a casino, or magnetically coded credit cards or debit cards frequently used with national credit organizations such as VISA, MASTERCARD, AMERICAN EXPRESS, or banks and other institutions.

The gaming system may include other types of participant identification mechanisms which may use a fingerprint image, eye blood vessel image reader, or other suitable biological information to confirm identity of the player. Still further it is possible to provide such participant identification information by having the dealer manually code in the information in response to the player indicating his or her code name or real name Such additional identification could also be used to confirm credit use of a smart card, transponder, and/or player's personal player input device (UID).

The gaming system 500 also includes memory 516 which may include, for example, volatile memory (e.g., RAM 509), non-volatile memory 519 (e.g., disk memory, FLASH memory, EPROMs, etc.), unalterable memory (e.g., EPROMs 508), etc. The memory may be configured or designed to store, for example: 1) configuration software 514 such as all the parameters and settings for a game playable on the gaming system; 2) associations 518 between configuration indicia read from a device with one or more parameters and settings; 3) communication protocols allowing the processor 510 to communicate with peripheral devices and I/O devices 511; 5) a secondary memory storage device 515 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming system to communicate with local and non-local devices using such protocols; etc. In one implementation, the master gaming controller 512 communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers 542 may be stored in memory 516. Example of different types of device drivers may include device drivers for gaming system components, device drivers for gaming system components, etc. Typically, the device drivers 542 utilize a communication protocol of some type that enables communication with a particular physical device. The device driver abstracts the hardware implementation of a device. For example, a device drive may be written for each type of card reader that may be potentially connected to the gaming system. Examples of communication protocols used to implement the device drivers include Netplex, USB, Serial, Ethernet 575, Firewire, I/O debouncer, direct memory map, serial, PCI, parallel, RF, Bluetooth™ near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 516 by the processor 510 to allow communication with the device. For instance, one type of card reader in gaming system 500 may be replaced with a second type of card reader where device drivers for both card readers are stored in the memory 516.

In some embodiments, the software units stored in the memory 516 may be upgraded as needed. For instance, when the memory 516 is a hard drive, new games, game options, various new parameters, new settings for existing parameters, new settings for new parameters, device drivers, and new communication protocols may be uploaded to the memory from the master gaming controller 512 or from some other external device. As another example, when the memory 516 includes a CD/DVD drive including a CD/DVD designed or configured to store game options, parameters, and settings, the software stored in the memory may be upgraded by replacing a first CD/DVD with a second CD/DVD. In yet another example, when the memory 516 uses one or more flash memory 519 or EPROM 508 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 500 may also include various authentication and/or validation components 544 which may be used for authenticating/validating specified gaming system components such as, for example, hardware components, software components, firmware components, information stored in the gaming system memory 516, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Sensors 560 may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; etc.

In one implementation, at least a portion of the sensors 560 and/or input devices 530 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player may include input functionality for enabling players to provide their game play decisions/instructions (and/or other input) to the dealer using the touch keys and/or other player control sensors/buttons. Additionally, such input functionality may also be used for allowing players to provide input to other devices in the casino gaming network (such as, for example, player tracking systems, side wagering systems, etc.) Wireless communication components 556 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

An example of a near-field communication protocol is the ECMA-340 "Near Field Communication—Interface and Protocol (NFCIP-1)", published by ECMA International (www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 5 devices using such wireless communication protocols.

Power distribution components 558 may include, for example, components or devices which are operable for providing wireless power to other devices. For example, in one implementation, the power distribution components 558 may include a magnetic induction system which is adapted to provide wireless power to one or more portable UIDs at the gaming system. In one implementation, a UID docking region may include a power distribution component which is able to recharge a UID placed within the UID docking region without requiring metal-to-metal contact.

In at least one embodiment, motion/gesture detection component(s) 551 may be configured or designed to detect player (e.g., player, dealer, and/or other persons) movements and/or gestures and/or other input data from the player. In some embodiments, each gaming system may have its own respective motion/gesture detection component(s). In other embodiments, motion/gesture detection component(s) 551 may be implemented as a separate sub-system of the gaming system which is not associated with any one specific gaming system or device.

Game And Wager Data Collection Component(s) 576 may include functionality for facilitating, enabling, initiating, and/or performing collection and reporting of various types of information relating to conditions and/or events occurring at an associated gaming device and/or gaming table game, such as, for example game-related information, player tracking information, wager-related information (e.g., including financial transaction events), and/or other types of data/information described and/or referenced herein.

Figure 6:
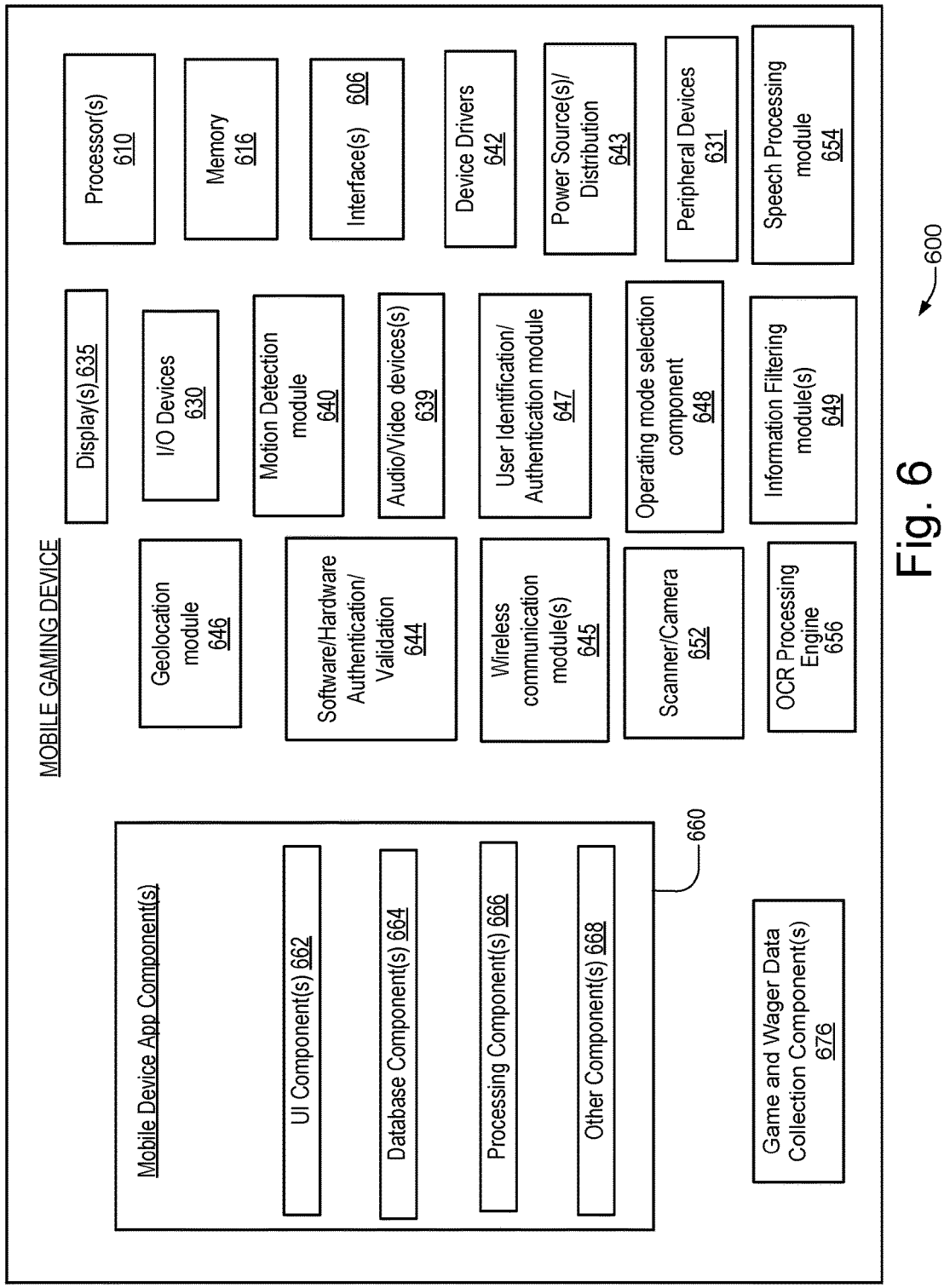
FIG. 6 is a simplified block diagram of an exemplary mobile gaming device 600 in accordance with a specific embodiment.

FIG. 6 is a simplified block diagram of an example mobile gaming device 600 in accordance with a specific embodiment. In at least one embodiment, one or more players may participate in a live, multiplayer, wager-based, virtual table game session using mobile gaming devices. In at least some embodiments, the mobile gaming device may be configured or designed to include or provide functionality which is similar to that of an electronic gaming device (EGD) such as that described, for example, in FIGS. 4 and 5.

As illustrated in the example of FIG. 6, mobile gaming device 600 may include a variety of components, modules and/or systems for providing various functionality. For example, as illustrated in FIG. 6, mobile gaming device 600 may include Mobile Device Application components (e.g., 660), which, for example, may include, but are not limited to, one or more of the following (or combinations thereof):

UI Components 662 such as those illustrated, described, and/or referenced herein.

Database Components 664 such as those illustrated, described, and/or referenced herein.

Processing Components 666 such as those illustrated, described, and/or referenced herein.

Other Components 668 which, for example, may include components for facilitating and/or enabling the mobile gaming device to perform and/or initiate various types of operations, activities, functions such as those described herein.

In at least one embodiment, the mobile gaming device may include Mobile Device App Component(s) which have been configured or designed to provide functionality for enabling or implementing at least a portion of the various automated money laundering detection and reporting techniques at the mobile gaming device.

According to specific embodiments, various aspects, features, and/or functionalities of the mobile gaming device may be performed, implemented and/or initiated by one or more of the following types of systems, components, systems, devices, procedures, processes, etc. (or combinations thereof):

Processor(s) 610
Device Drivers 642
Memory 616
Interface(s) 606
Power Source(s)/Distribution 643
Geolocation module 646
Display(s) 635
I/O Devices 630
Audio/Video devices(s) 639
Peripheral Devices 631
Motion Detection module 640
User Identification/Authentication module 647
Client App Component(s) 660
Other Component(s) 668
UI Component(s) 662
Database Component(s) 664
Processing Component(s) 666
Software/Hardware Authentication/Validation 644
Wireless communication module(s) 645
Information Filtering module(s) 649
Operating mode selection component 648
Speech Processing module 654

Scanner/Camera 652
OCR Processing Engine 656
Game and Wager Data Collection Component(s) 676
etc.

Figure 7:
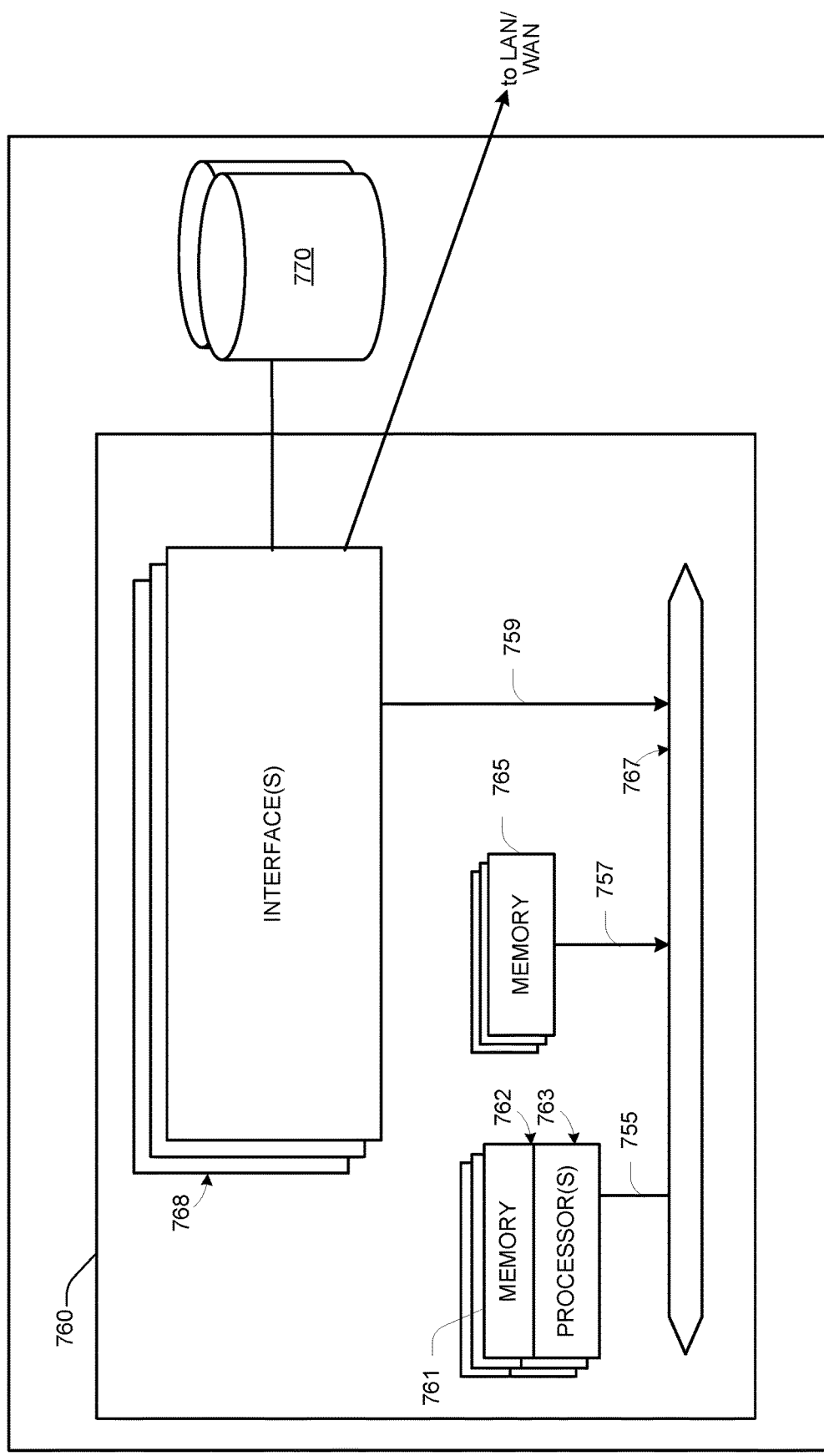
FIG. 7 illustrates an example embodiment of a server system 780 which may be used for implementing various aspects/features described herein.

FIG. 7 illustrates an example embodiment of a server system 780 which may be used for implementing various aspects/features described herein. In at least one embodiment, the server system 780 includes at least one network device 760, and at least one storage device 770 (such as, for example, a direct attached storage device). In one embodiment, server system 780 may be suitable for implementing at least some of the automated money laundering detection and reporting techniques described herein.

In according to one embodiment, network device 760 may include a master central processing unit (CPU) 762, interfaces 768, and a bus 767 (e.g., a PCI bus). When acting under the control of appropriate software or firmware, the CPU 762 may be responsible for implementing specific functions associated with the functions of a desired network device. For example, when configured as a server, the CPU 762 may be responsible for analyzing packets; encapsulating packets; forwarding packets to appropriate network devices; instantiating various types of virtual machines, virtual interfaces, virtual storage volumes, virtual appliances; etc. The CPU 762 preferably accomplishes at least a portion of these functions under the control of software including an operating system (e.g. Linux), and any appropriate system software (such as, for example, AppLogic™ software).

CPU 762 may include one or more processors 763 such as, for example, one or more processors from the AMD, Motorola, Intel and/or MIPS families of microprocessors. In an alternative embodiment, processor 763 may be specially designed hardware for controlling the operations of server system 780. In a specific embodiment, a memory 761 (such as non-volatile RAM and/or ROM) also forms part of CPU 762. However, there may be many different ways in which memory could be coupled to the system. Memory block 761 may be used for a variety of purposes such as, for example, caching and/or storing data, programming instructions, etc.

The interfaces 768 may be typically provided as interface cards (sometimes referred to as "line cards"). Alternatively, one or more of the interfaces 768 may be provided as on-board interface controllers built into the system motherboard. Generally, they control the sending and receiving of data packets over the network and sometimes support other peripherals used with the server system 780. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G/4G/5G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

In at least one embodiment, some interfaces may be configured or designed to allow the server system 780 to communicate with other network devices associated with various local area network (LANs) and/or wide area networks (WANs). Other interfaces may be configured or designed to allow network device 760 to communicate with one or more direct attached storage device(s) 770.

Although the system shown in FIG. 7 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 765, which, for example, may include random access memory (RAM)) configured to store data, program instructions for the general-purpose network operations and/or other information relating to the functionality of the various automated money laundering detection and reporting techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
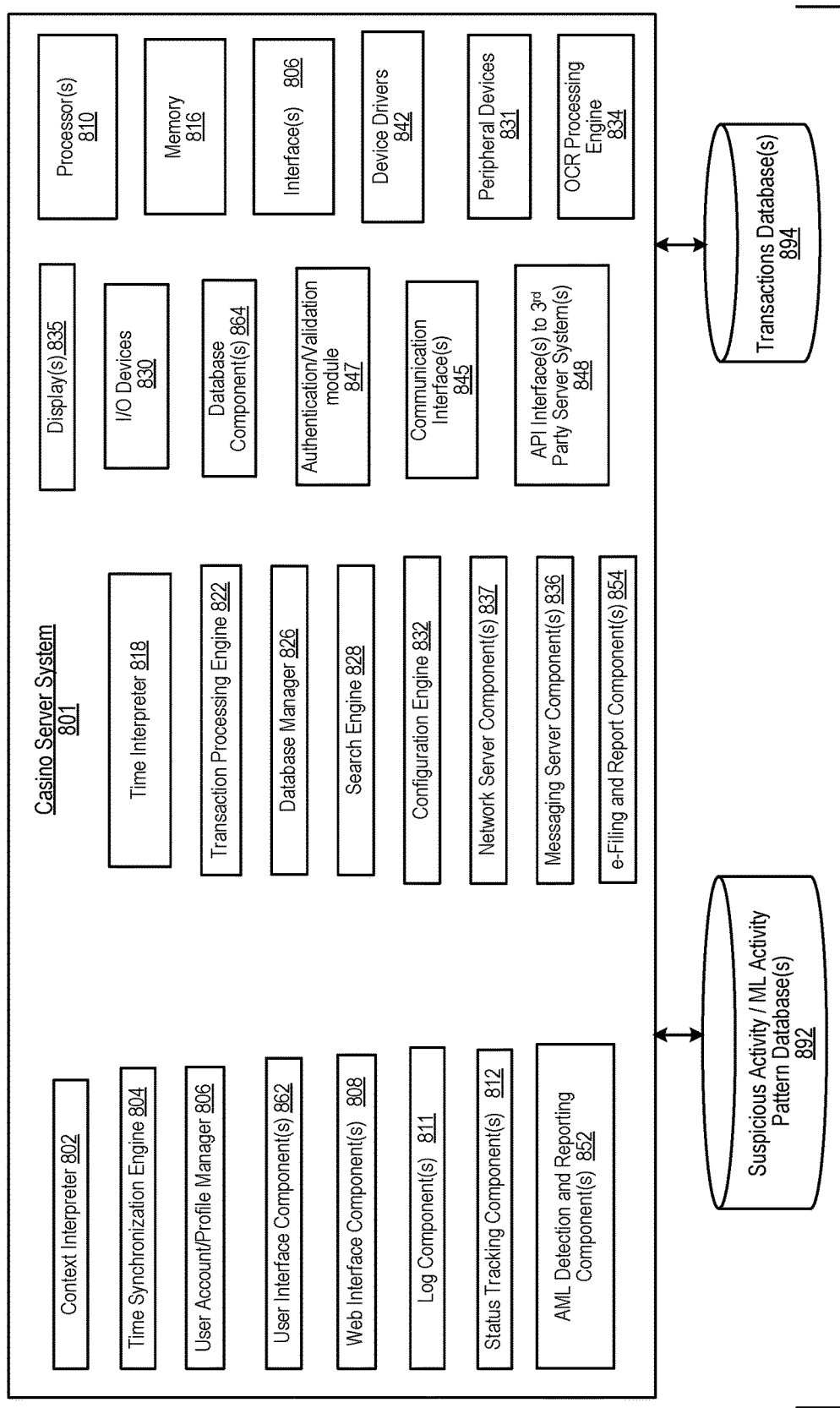
FIG. 8 illustrates an example of a functional block diagram of a Casino Gaming Server System in accordance with a specific embodiment.

FIG. 8 illustrates an example of a functional block diagram of a Casino Server System in accordance with a specific embodiment. In at least one embodiment, the Casino Server System may be operable to perform and/or implement various types of functions, operations, actions, and/or other features, such as, for example, one or more of those described and/or referenced herein.

In at least one embodiment, the Casino Server System may include a plurality of components operable to perform and/or implement various types of functions, operations, actions, and/or other features such as, for example, one or more of the following (or combinations thereof):

Context Interpreter (e.g., 802) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (or combinations thereof):
  location-based criteria (e.g., geolocation of mobile gaming device, geolocation of EGD, etc.)
  time-based criteria
  identity of user(s)
  user profile information
  transaction history information
  recent user activities
  etc.

Time Synchronization Engine (e.g., 804) which, for example, may be operable to manages universal time synchronization (e.g., via NTP and/or GPS)

Search Engine (e.g., 828) which, for example, may be operable to search for transactions, logs, game history information, player information, automated money laundering detection and reporting information, etc., which may be accessed from one or more local and/or remote databases.

Configuration Engine (e.g., 832) which, for example, may be operable to determine and handle configuration of various customized configuration parameters for one or more devices, component(s), system(s), process(es), etc.

Time Interpreter (e.g., 818) which, for example, may be operable to automatically and/or dynamically modify or change identifier activation and expiration time(s) based on various criteria such as, for example, time, location, transaction status, etc.

Authentication/Validation Component(s) (e.g., 847) (password, software/hardware info, SSL certificates) which, for example, may be operable to perform various types of authentication/validation tasks such as one or more of those described and/or referenced herein.

Transaction Processing Engine (e.g., 822) which, for example, may be operable to handle various types of transaction processing tasks such as, for example, one or more of those described and/or referenced herein.

OCR Processing Engine (e.g., 834) which, for example, may be operable to perform image processing and optical character recognition of images such as those captured by a gaming device camera, for example.

Database Manager (e.g., 826) which, for example, may be operable to handle various types of tasks relating to database updating, database management, database access, etc. In at least one embodiment, the Database Manager may be operable to manage game history databases, player tracking databases, etc.

Log Component(s) (e.g., 811) which, for example, may be operable to generate and manage transactions history logs, system errors, connections from APIs, etc.

Status Tracking Component(s) (e.g., 812) which, for example, may be operable to automatically and/or dynamically determine, assign, and/or report updated transaction status information based, for example, on the state of the transaction.

Gateway Component(s) (e.g., 814) which, for example, may be operable to facilitate and manage communications and transactions with external Payment Gateways.

Web Interface Component(s) (e.g., 808) which, for example, may be operable to facilitate and manage communications and transactions with virtual live game table web portal(s).

API Interface(s) to Casino Server System(s) (e.g., 846) which, for example, may be operable to facilitate and manage communications and transactions with API Interface(s) to Server System(s) of various casino networks.

API Interface(s) to 3rd Party Server System(s) (e.g., 848) which, for example, may be operable to facilitate and manage communications and transactions with API Interface(s) to 3rd Party Server System(s)

At least one processor 810. In at least one embodiment, the processor(s) 810 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of a gaming system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 816, which, for example, may include volatile memory (e.g., RAM), non-volatile memory (e.g., disk memory, FLASH memory, EPROMs, etc.), unalterable memory, and/or other types of memory. In at least one implementation, the memory 816 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile gaming system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein.

Interface(s) 806 which, for example, may include wired interfaces and/or wireless interfaces. In at least one implementation, the interface(s) 806 may include functionality similar to at least a portion of functionality implemented by one or more computer system interfaces such as those described herein and/or generally known to one having ordinary skill in the art.

Device driver(s) 842. In at least one implementation, the device driver(s) 842 may include functionality similar to at least a portion of functionality implemented by one or more computer system driver devices such as those described herein and/or generally known to one having ordinary skill in the art.

One or more display(s) 835.

Messaging Server Component(s) 836, which, for example, may be configured or designed to provide various functions and operations relating to messaging activities and communications.

Network Server Component(s) 837, which, for example, may be configured or designed to provide various functions and operations relating to network server activities and communications.

AML Detection and Reporting Component(s) 852. In at least one embodiment, the AML Detection and Reporting components may be configured or designed to include functionality for facilitating, aggregating data, enabling, initiating, and/or performing various types of financial transaction analysis, AML analysis and detection, and reporting operation(s), action(s), and/or feature(s) such as one or more of those described herein.

E-Filing and Report Component(s) 854. In at least one embodiment, the e-Filing and Report Component(s) may be configured or designed to include functionality for facilitating, enabling, initiating, and/or performing various types of reporting and notification activities such as, for example:

automated electronic filing of detected suspicious ML activities at appropriate governmental agencies;

automated generation and/or transmission of notifications and alerts (e.g., such as those relating to detected suspicious ML activities) to appropriate authorities (e.g., police, Federal agencies, local law enforcement, casino security personnel, casino employees, etc.);

and/or other types of types of reporting and notification activities such as those described herein.

Suspicious Activity/ML Activity Pattern Database(s) 892. In at least one embodiment, the Suspicious Activity/ML Activity Pattern Database(s) may be configured or designed to include functionality for storing and/or providing access to various types of information relating to suspicious activity pattern and ML pattern analysis and detection, and/or other types of information described and/or referenced herein.

Transactions Database(s) 894. In at least one embodiment, the Transactions Database(s) may be configured or designed to include functionality for storing and/or providing access to various types of information, events, and/or conditions such as, for example, one or more of the following (or combinations thereof): casino-related information, game play information, wager information, financial transaction information, and/or other types of information described and/or referenced herein.

Etc.

Money Laundering Pattern Detection

Various embodiments of automated money laundering detection, analysis, and reporting techniques described herein are directed to different methods and systems for enabling automated, rule-based and/or pattern-based monitoring, detection, analysis, and reporting of suspicious activities relating to financial or monetary conducted in casino gaming establishments, casino networks, and/or non-casino environments. According to different embodiments, one or more Suspicious Activity/ML Activity Pattern Database(s) (e.g., 892) may be provided for storing and/or providing access to various types of information for use in conducting suspicious ML activity pattern analysis, detection and/or reaction. For example, in some embodiments, at least a portion of the information stored in the Suspicious Activity/ML Activity Pattern Database(s) may include rule-based and/or pattern-based criteria for use in facilitating identification of suspicious ML activity during AML analysis of casino-related financial transactions.

Non-limiting examples of various suspicious ML activity rule-based and/or pattern-based criteria may include, but are not limited to, one or more of the following (or combinations thereof):

A. Customers Who Try to Keep their Transactions Just Below the Reporting or Recordkeeping Thresholds, such as:

Two or more customers each purchase chips with currency in amounts between $3,000 and $10,000, engage in minimal gaming, combine the chips (totaling in excess of $10,000), and one of them redeems the chips for a casino check.

A customer seeks to cash out chips, tickets or tokens in excess of $10,000, but when asked for identification for completing a Currency Transaction Report by Casinos (CTRC) form, reduces the amount of chips or tokens to be cashed out to less than $10,000.

A customer pays off a large credit debt, such as markers or bad checks, of more than $20,000 over a short period of time (e.g., less than one week), through a series of currency transactions, none of which exceeds $10,000 in a gaming day.

A customer receives a race book or sports pool payout in excess of $10,000 and requests currency of less than $10,000 and the balance paid in chips. The customer then goes to the cage and redeems the remaining chips for currency in an amount that is less than the CTRC reporting threshold.

A customer, who is a big winner, enlists another individual (who is not a partner of the customer in the gaming activity), to cash out a portion of the chips or tokens won to avoid the filing of a CTRC, IRS Form W-2G or other tax forms.

A customer attempts to influence, bribe, corrupt, or conspire with an employee not to file CTRCs.

Using a Cage Solely for Its Banking-Like Financial Services

B. Customer Activity Involving Unusual Banking-Like Transactions at the Cage, Such as:

A customer wires funds derived from non-gaming proceeds, to or through a bank and/or a non-bank financial institution(s) located in a country that is not his/her residence or place of business.

A customer appears to use a casino account primarily as a temporary repository for funds by making frequent deposits into the account and, within a short period of time (e.g., one to two days), requests money transfers of all but a token amount to domestic or foreign-based bank accounts.

C. Customers Conducting Large Transactions on the Floor with Little or No Related Gaming Activity and without Reasonable Explanation, Such as:

A customer purchases a large amount of chips with currency at a table, engages in minimal gaming, and then redeems the chips for a casino check.

A customer draws casino markers (e.g., between $5,000 and $10,000) which he/she uses to purchase chips, engages in minimal or no gaming activity, and then pays off the markers in currency and subsequently redeems the chips for a casino check.

A customer makes a large deposit using numerous small denomination bills (e.g., $5s, $10s and $20s); and withdraws it in chips at a table game, engages in minimal gaming, and exchanges remaining chips at a cage for large denomination bills (e.g., $100), a casino check or a money transfer.

While reviewing computerized player rating records, an employee determines that a customer frequently purchases chips with currency between $5,000 and $10,000, engages in minimal gaming, and walks away with the chips.

A customer using a slot club account card inserts $2,990 of paper money (or an amount just below established thresholds) into a bill acceptor on a slot machine or video lottery terminal (e.g., contemporaneously inserting $5s, $10s and $20s), accumulating credits with minimal or no gaming activity, presses the "cash out" button to obtain a ticket. The customer goes to three other machines and conducts the same activity for $2,990 at each machine. Then the customer redeems the tickets for large denomination bills or casino checks with different cage cashiers at different times in a gaming day.

A customer transfers funds to a casino for deposit into a front money account in excess of $5,000; and withdraws it in chips at a table game, engages in minimal or no gaming activity, and exchanges remaining chips at a cage for a casino check.

Cashing out chips when the casino had no record of the individual having bought or played with chips.

Buying chips with cash, casino credit, credit card advances, wired funds, or funds withdrawn from safekeeping accounts, and then playing minimally or not playing at all. Some subjects cashed out chips while others left the casino with unredeemed chips.

Receiving wired funds into a casino front money account and then requesting that the funds be wired to a bank account without playing.

Frequently depositing money orders or casino checks from other casinos into front money accounts, buying in and playing minimally, or not playing and then cashing out through issuance of a casino check.

Patrons inserted large numbers of small denomination bills into casino gaming machines with little or no play in order to exchange small bills for casino tokens. Patrons then redeemed the casino tokens for large bills.

Patrons used small bills to buy in at gaming tables, received large denomination chips, and redeemed those chips with little or no play for large denomination bills.

D. Customers Conducting Illegal Activity, Such as:

A customer conducts transactions that the casino believes to be the result of some illegal activity or from an illegal source (e.g., narcotics trafficking).

A customer or a group of individuals forge signatures or use counterfeit business or personal checks to obtain currency, chips or tokens.

Customers secured markers with personal checks that were returned unpaid, either because the account held insufficient funds or because the depository institution had previously closed the account.

Patrons negotiated or attempted to negotiate stolen, forged, or altered checks.

Patrons attempted to pass counterfeit bills.

Casino patrons use their player club points to purchase significant amounts of merchandise at independently owned and operated retail stores on casino premises.

E. Transactions Involving Suspicious or Unusual Characteristics and/or Activities, Such as:

A pair of bettors frequently cover between them both sides of an even bet, such as:
Betting both "red and black" or "odd and even" on roulette; or
Betting both with and against the bank in baccarat/mini-baccarat; or
Betting the "pass line" or "come line" and the "don't pass line" or "don't come line" in craps; and
the aggregate amount of both bettors' total wagering is in excess of $5,000.

A customer routinely bets both sides of the same line for sporting events (e.g., betting both teams to win) and thus the amount of overall loss to the customer is minimal (known as hedging).

A customer requests the issuance of casino checks, each less than $3,000, which are made payable to third parties or checks without a specified payee.

A customer furnishes a legitimate type of identification document, in connection with the completion of a CTRC, or the opening of a deposit, credit or check cashing account, which:
Does not match the customer's appearance (e.g., different age, height, eye color, sex); or
Is false or altered (e.g., address changed, photograph substituted).

A customer presents information for the completion of CTRCs for different gaming days that contains conflicting identification information, such as:
Different address or different spelling or numeration in address;
Different state driver's license number; or
Different social security number.

A customer makes large deposits or pays off large markers with multiple instruments (e.g., cashier's checks, money orders, traveler's checks, or foreign drafts) in amounts of less than $3,000.

A customer withdraws a large amount of funds (e.g., $30,000 or more) from a deposit account and requests that multiple casino checks be issued each of which is less than $10,000.

A customer arranges large money transfers out of the country which are paid for by multiple cashier's checks from different financial institutions in amounts under $10,000.

Reducing the number of chips or tokens to be cashed out at a cage when asked to provide identification or a Social Security Number (SSN), when the cash out was over $10,000, or when a subject had previously cashed out chips or tokens and the additional cash out would exceed $10,000 in a gaming day. This was the most frequently reported structuring activity.

Reducing the amount of cash buy-ins at gaming tables to avoid providing identification or an SSN.

Using agents to cash out chips.

Cashing out chips, tickets, and/or tokens multiple times a day, at different times, or at different windows/cages.

Requesting jackpot winnings exceeding $10,000 to be paid in two or three payments. In some cases, winnings were placed on deposit and withdrawn in cash amounts under the currency transaction reporting threshold.

Wiring funds into front money accounts and withdrawing those funds, in cash, in smaller increments to avoid conducting one large-dollar reportable transaction.

Repaying outstanding balances with structured cash payments, apparently to avoid a reportable transaction.

Purchasing chips with cash just under the reporting threshold and then purchasing additional chips at the table, again with cash.

Placing bets at multiple sportsbooks, usually at related properties, in an attempt to structure bets that in the aggregate would exceed the reporting threshold. Placing bets at multiple properties may also conceal aggregated winnings over the reporting threshold.

Customers repeatedly inquire about the CTRC reporting requirements, and whether their buy-ins and/or cash-outs had reached the reporting threshold.

A high-stakes player frequently wires funds via depository institutions to the front money account of another high-stakes customer.

Customer uses markers as casino loans by requesting advances on credit through markers, often at gaming tables, then does not play or play only minimally Customers using player rating accounts record their gaming history on each other's accounts, possibly to conceal wins and losses by each customer.

Surveillance determines that the person attempting to claim a slot jackpot is not the actual jackpot winner.

Patrons wager higher amounts than their occupations appear able to support.

Casino employees who assist customers by failing to log patrons' multiple currency transactions into the casinos' Multiple Transaction Logs.

Patrons attempting to reduce the dollar amount received from their chip redemptions, apparently to avoid a CTRC filing requirements.

Reporting of Suspicious ML Activity

According to different embodiments, it may be preferable or desirable for a casino to develop and implement an effective anti-money laundering program. The casino's size, location, dollar volume, types of games, type/nature of customers, and internal controls are some of the factors to consider when analyzing the possible risk of money laundering occurring at the casino. Additionally, in at least some embodiments, an effective anti-money laundering program may be configured or designed to include automated notification and reporting mechanisms (such as, for example, E-Filing and Report Component(s) 854) which may include functionality for facilitating, enabling, initiating, and/or performing various types of reporting and notification activities such as, for example: automated electronic filing of detected suspicious ML activities at appropriate governmental agencies; automated generation and/or transmission of notifications and alerts (e.g., such as those relating to detected suspicious ML activities) to appropriate authorities (e.g., police, Federal agencies, local law enforcement, casino security personnel, casino employees, etc.); and/or other types of types of reporting and notification activities such as those described herein.

In at least one embodiment, the automated money laundering analysis, detection and reporting components of a Casino Gaming Network may be operable to: (i) automatically analyze data relating to financial transaction events and other activities occurring at the casino; (ii) automatically detect suspicious ML activities and/or reportable financial transaction events; and (iii) automatically generate and electronically file appropriate electronic reports (e.g., relating to the detected suspicious ML activities and/or reportable financial transaction events) at one or more specified entities or agencies.

For example, in one embodiment, the automated money laundering analysis, detection and reporting components of a Casino Gaming Network may automatically generate and electronically file one or more a Currency Transaction Report(s) (CTRs) for reporting each transaction in currency involving cash-in and cash-out of more than $10,000 in a gaming day.

In at least one embodiment, transactions in currency involving cash-in may include, but are not limited to one or more of the following (or combinations thereof):
Purchase of chips, tokens, and plaques
Front money deposits
Safekeeping deposits
Payments on any form of credit, including markers and counter checks
Bets of currency
Currency received by a casino for transmittal of funds through wire transfer for customer
Purchases of a casino's check
Exchanges of currency for currency, including foreign currency In at least one embodiment, transactions in currency involving cash-out may include, but are not limited to one or more of the following (or combinations thereof):
Redemption of chips, tokens and plaques
Front money withdrawals
Safekeeping withdrawals
Advances on any form of credit, including markers and counter checks
Payments on bets, excluding slot and video lottery terminal jackpots
Payments by a casino to a customer based on receipts of funds through wire transfer for credit to a customer
Cashing of checks or other negotiable instruments
Exchanges of currency for currency, including foreign currency
Reimbursements for customers' travel and entertainment expenses by the casino In some embodiments, multiple currency transactions may be treated as a single transaction if, for example, the casino has knowledge that they are by, or on behalf of, any person and result in either cash in or cash-out totaling more than $10,000 during any gaming day. In some embodiments, cash-in and cash-out transactions may preferably be aggregated separately. In some embodiments, a CTR may preferably be electronically filed within 15 calendar days following the day the reportable transaction occurs. In some embodiments, Suspicious Activity Reports (SARs) be filed for any detected suspicious transaction(s) that may be relevant to the possible violation of any law or regulation, and which involves or aggregates at least $3,000 in funds or other assets.

According to different embodiments, Casino Gaming Networks may be configured or designed to retain copies of electronically filed CTR and SAR reports for a specified period of time, as may be legally required (e.g., five years from the date of the report). Additionally, in some embodiments, evidence relating to any detected suspicious ML activity (e.g., such as financial transactions, player information, gaming information, wagering information, captured video or images, etc.) may also be retained for a specified period of time.

In at least one embodiment, the term "Casino Cage may be interpreted to include a secure work area within a casino that houses cashiers and storage facilities for cash, chips, tokens, and credit documents. Cashiers at the cage conduct transactions with customers and other casino areas.

In at least one embodiment, the term "Front Money" may be interpreted to include money deposited by a customer into a personal casino account with a cage cashier. The customer can later withdraw the front money at gaming tables or at the cage in the form of chips, currency, casino check, or wire transfer.

In at least one embodiment, the term "Marker or Counter Check" may be interpreted to include credit extended to a customer in exchange for chips, tokens, or currency. The marker or counter check may be intended for use in gambling.

In at least one embodiment, the term "Multiple Transaction Log" may be interpreted to include casino and card club documents used to record and keep track of customer currency transaction activity above a given dollar threshold. Many casinos and card clubs maintain multiple transaction logs for pit and cage (including slot booth) transactions, sometimes pursuant to state, local, or tribal gaming laws, or within the ordinary course of business.

In at least one embodiment, the term "Player Club Points" may be interpreted to include casinos "club points" which may be awarded to casino patrons based on how much customers bet and how often they play. Patrons can redeem these club points for goods and services at restaurants, retail shops, or hotels.

In at least one embodiment, the term "Player Rating Card" may be interpreted to include a card used in a casino pit to keep track of a player's activity at a single gaming table for purposes of determining if a player is entitled to receive complimentary services ("comps"). Each time a rated player begins gambling at a table, designated casino employees who monitor customer's play prepare a "player rating card," also known as a "rating card" or "rating slip."

In at least one embodiment, casinos may assign different "Player Ratings" to different patrons which may be used for awarding complimentary services to attract and retain customers. A common player rating method is based on theoretical win—the amount a casino expects to win from a particular customer. It is calculated using a number of factors, including the length of time the gambler plays.

In at least one embodiment, the term "Pit" may be interpreted to include an area of a casino or card club floor that contains gaming tables. Each pit contains several gaming tables organized by game type. Each pit is under the supervision of a single floor supervisor (or "pit boss"). Customers can buy chips and conduct other transactions at the pit.

In at least one embodiment, the term "Sportsbook" may be interpreted to include a place where individuals can wager on various sports competitions, such as golf, football, basketball, baseball, boxing, and horse racing.

In at least one embodiment, the term "Surveillance" may be interpreted to include various types of surveillance components including, for example, video cameras, monitors, recorders, video printers, switches, selectors and other ancillary equipment to observe and record activities at the gaming establishment Casinos often identify individuals conducting unusual, suspicious or potentially criminal financial transactions through surveillance.

In at least one embodiment, the term "cash" may be interpreted to include coin and currency of the United States or any other country, and may include cashier's checks, gaming vouchers, bank drafts, traveler's checks, or money orders received over $10,000 in one transaction (or two or more related transactions) during a 12-month period.

Example Procedures and Flow Diagrams

Figure 10:
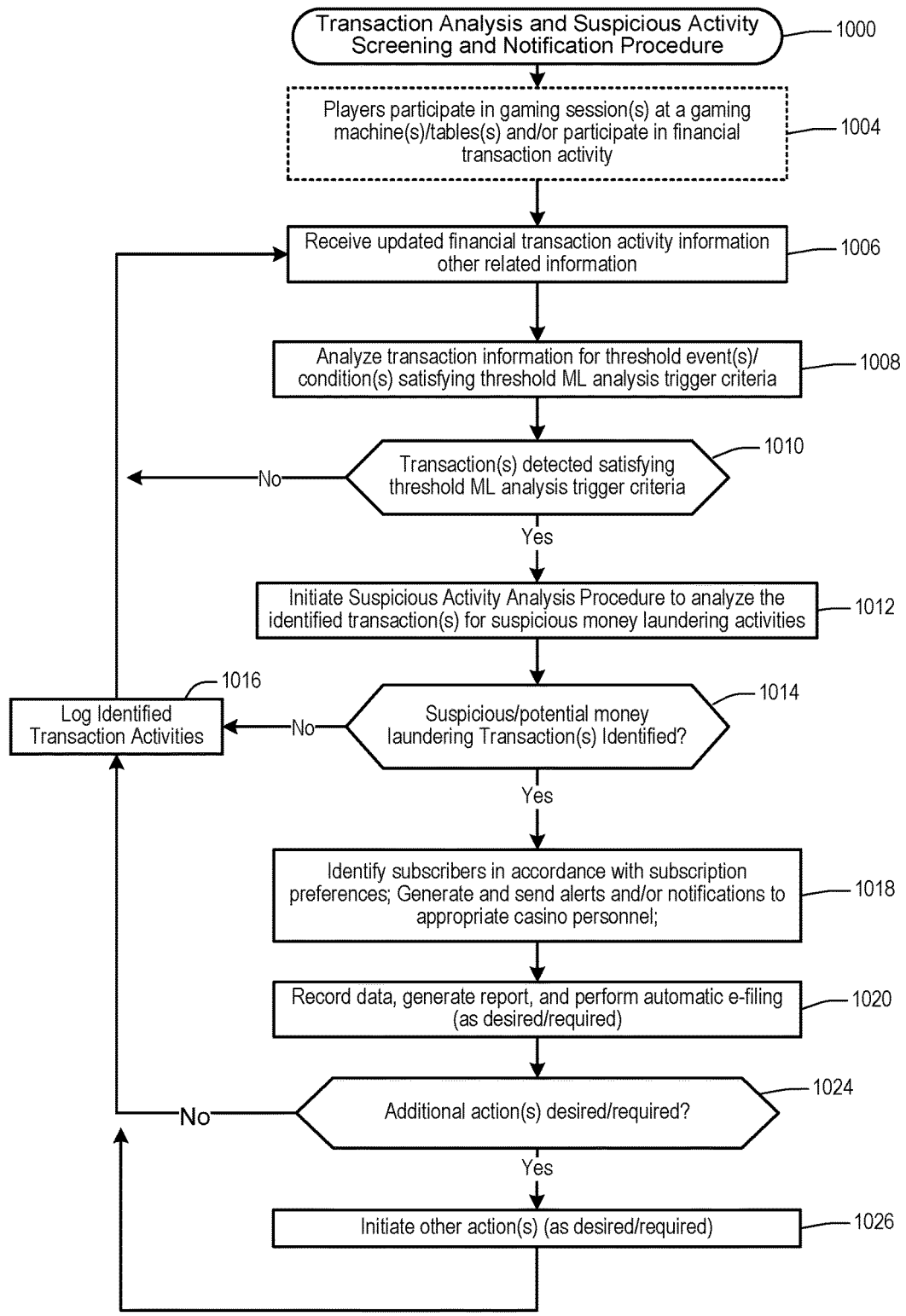
FIGS. 10-11 illustrate various example embodiments of different suspicious transactional activity analysis, detection and reporting procedures and/or procedural flows which may be used for facilitating activities relating to one or more of the automated money laundering analysis, detection and reporting aspects disclosed herein.
Figure 11:
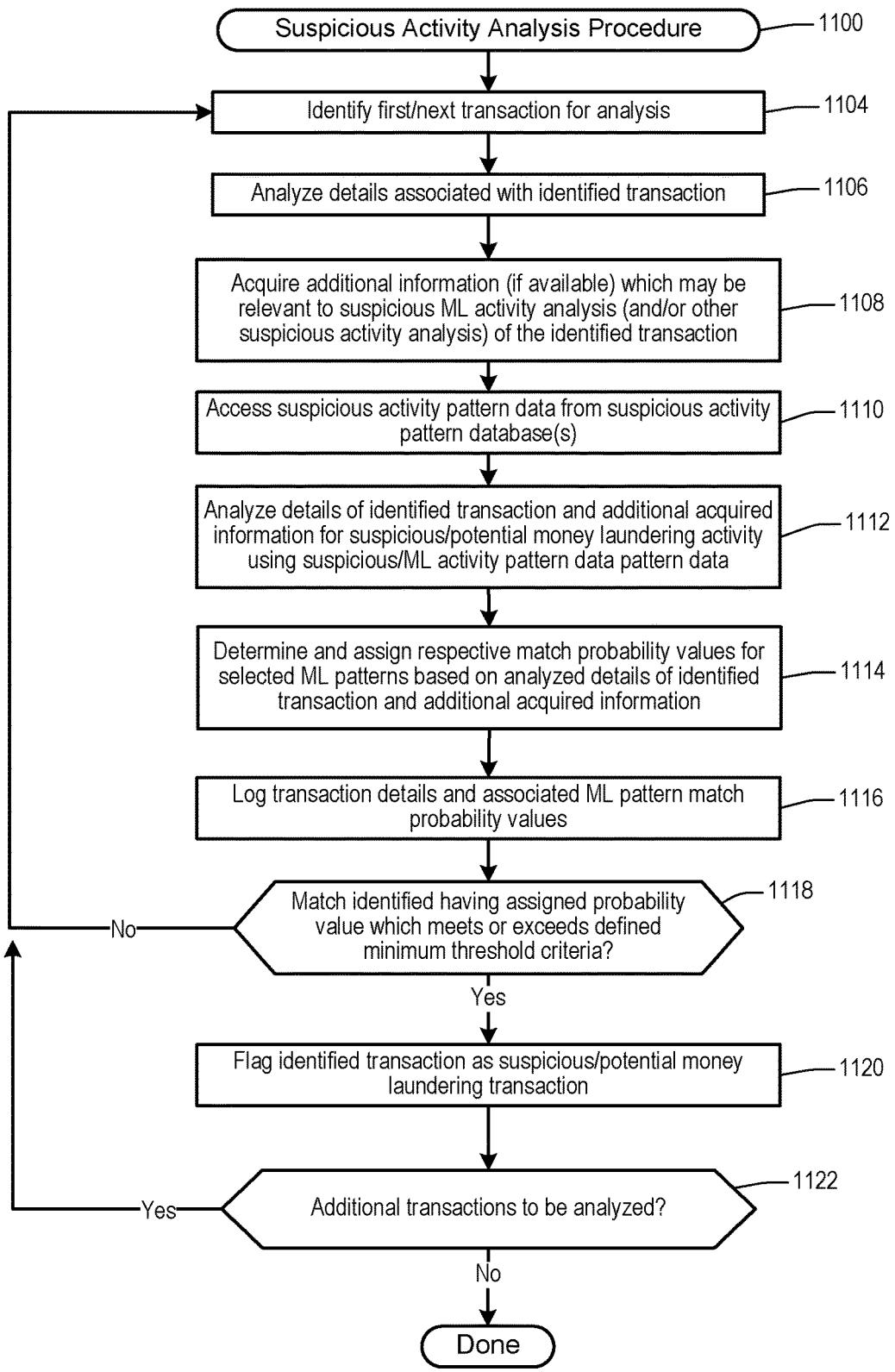

FIGS. 10-11 illustrate various example embodiments of different suspicious transactional activity analysis, detection and reporting procedures and/or procedural flows which may be used for facilitating activities relating to one or more of the automated money laundering analysis, detection and reporting aspects disclosed herein. More specifically, FIG. 10 shows an example of a Transaction Analysis and Suspicious Activity Screening and Notification Procedure 1000 in accordance with a specific embodiment, and FIG. 11 shows an example of a Suspicious Activity Analysis Procedure 1100 in accordance with a specific embodiment.

According to different embodiments, at least a portion of the functions, operations, actions, and/or other features provided by the various procedures, steps, and/or operations described herein may be implemented at one or more client systems(s); at one or more server systems(s) such as, for example, casino server system(s) (e.g., 140, FIG. 1), cloud server system(s) (e.g., 160, FIG. 1); and/or may be implemented at one or more other types of system(s) described and/or referenced herein.

In at least one embodiment, one or more of the various procedures, steps, and/or operations described herein may be operable to utilize and/or generate various different types of data and/or other types of information when performing specific tasks and/or operations. This may include, for example, input data/information and/or output data/information. For example, in at least one embodiment, the automated money laundering analysis, detection and reporting procedures may be operable to access, process, and/or otherwise utilize information from one or more different types of sources, such as, for example, one or more local and/or remote memories, devices and/or systems. Additionally, in at least one embodiment, the automated money laundering analysis, detection and reporting procedures may be operable to generate one or more different types of output data/information, which, for example, may be stored in memory of one or more local and/or remote devices and/or systems. Examples of different types of input data/information and/or output data/information which may be accessed and/or utilized by the automated money laundering analysis, detection and reporting procedures may include, but are not limited to, one or more of those described and/or referenced herein.

In at least one embodiment, a given instance of one or more of the various procedures described herein may access and/or utilize information from one or more associated databases. In at least one embodiment, at least a portion of the database information may be accessed via communication with one or more local and/or remote memory devices. Examples of different types of data which may be accessed by the automated money laundering analysis, detection and reporting procedures may include, but are not limited to, one or more of those described and/or referenced herein.

According to specific embodiments, multiple instances or threads of the Transaction Analysis and Suspicious Activity Screening and Notification Procedure and/or Suspicious Activity Analysis Procedure may be concurrently implemented and/or initiated via the use of one or more processors and/or other combinations of hardware and/or hardware and software. For example, in at least some embodiments, various aspects, features, and/or functionalities of the Suspicious Activity Screening and Notification Procedure and/or Suspicious Activity Analysis Procedure may be performed, implemented and/or initiated by one or more of the various systems, components, systems, devices, procedures, processes, etc., described and/or referenced herein.

According to different embodiments, one or more different threads or instances of the Suspicious Activity Screening and Notification Procedure and/or Suspicious Activity Analysis Procedure may be initiated in response to detection of one or more conditions or events satisfying one or more different types of minimum threshold criteria for triggering initiation of at least one instance of one or more of the procedures. Various examples of conditions or events which may trigger initiation and/or implementation of one or more different threads or instances of the various procedures may include, but are not limited to, one or more of those described and/or referenced herein.

According to different embodiments, one or more different threads or instances of the Suspicious Activity Screening and Notification Procedure and/or Suspicious Activity Analysis Procedure may be initiated and/or implemented manually, automatically, statically, dynamically, concurrently, and/or combinations thereof. Additionally, different instances and/or embodiments of the Suspicious Activity Screening and Notification Procedure and/or Suspicious Activity Analysis Procedure may be initiated at one or more different time intervals (e.g., during a specific time interval, at regular periodic intervals, at irregular periodic intervals, upon demand, etc.).

In at least one embodiment, initial configuration of a given instance of the Suspicious Activity Screening and Notification Procedure and/or Suspicious Activity Analysis Procedure may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of a given procedure may correspond to and/or may be derived from the input data/information.

Different embodiments of the Transaction Analysis and Suspicious Activity Screening and Notification Procedure 1000 and/or Suspicious Activity Analysis Procedure 1100 may be configured or designed to provide various methods and techniques for enabling automated, rule-based monitoring, analysis, detection and reporting of suspicious activities relating to financial or monetary transactions conducted in casino gaming establishments, casino networks, and/or non-casino environments. One or more of these transactions may occur at various casino-related devices, machines, systems, and/or locations of casino environments and/or non-casino environments.

FIG. 10 shows an example of a Transaction Analysis and Suspicious Activity Screening and Notification Procedure 1000 in accordance with a specific embodiment. As illustrated in the example embodiment of FIG. 10, at 1004 it may be assumed that casino patrons or customers participate in gaming and wagering activities at one or more gaming machine(s) and/or gaming tables(s), and/or participate in other types of financial transaction activity at the casino establishment (e.g., such as, for example cash in transactions; cash out transactions; credit transactions; money exchange transactions; money deposit transactions; money withdrawal transactions; wagering token transactions; payout transactions; purchase transactions; money transfer transactions; and/or other types of financial transactions which may occur at casino gaming establishments and/or casino networks).

According to different embodiments, information relating to casino-related financial transactions may be captured (e.g., in real-time or non-real-time) at the device, table, or system where the financial transaction even has occurred, and uploaded (e.g., in real-time or non-real-time) to a server such as, for example, the Casino Server System 140 (FIG. 1), AML Detection and Reporting Component(s) 141 (FIG. 1), AML Server 236 (FIG. 2), AML Detection and Reporting Services (e.g., 161, FIG. 1; 960, FIG. 9), etc.

For example, at the casino gaming devices and/or game tables, casino patrons may place wagers or participate in various cash-in transaction(s) by depositing their money (e.g., via cash, ticket voucher, wagering tokens, etc.), and/or by putting up credits (e.g., from pre-established credit accounts). Casino patrons may also participate in various cash-in transaction(s) at financial kiosks and cashier cages. Similarly, casino patrons may participate in various cash-out transaction(s) at different gaming devices, gaming tables, financial kiosks, cashier cages, etc. According to different embodiments, data and other information relating to each of these transactions may be automatically captured, uploaded to a casino server system, and analyzed for suspicious activities. Preferably, the capturing and uploading (or reporting) of the financial transaction information may be performed in real-time (or near real-time) so as to allow the casino to detect and respond to suspicious money laundering activities in a timely manner Examples of various types of data and/or information which may be captured (and uploaded) for a given financial transaction event may include, but are not limited to, one or more of the following (or combinations thereof):

transaction event amount;
transaction event location;
time of transaction event;
day of transaction event;
date of transaction event;
win amount;
game-related information (e.g., game ID, game play history, etc.);
wager-related information (e.g., credit meter, games won/lost, bet denomination, etc.);
information relating to identity of person initiating transaction (e.g., Player ID);
information relating to identity (e.g., asset ID) and location of gaming device/gaming table where transaction event occurred;
information relating to identity of other gaming device(s) and/or gaming table(s) (e.g., gaming devices/tables near to where the suspicious transaction event occurred) in which similar suspicious transaction events have recently been detected (e.g., within the past 4 hours);
information relating to identity of gaming table attendant(s) servicing gaming table/gaming device at time of transaction event;
information relating to identities of other players participating at the gaming table/gaming device at time of transaction event;
information relating to identity of gaming table attendant(s) servicing gaming table/gaming device at time of transaction event;
information relating to identity of financial kiosk machine where transaction event took place and the location code of the kiosk;
information relating to identity of cashier cage where transaction event took place;
information relating to identity of cashier attendant(s) on duty at cashier cage where transaction event took place;
Casino ID and location;
information relating to the bill validator status of the gaming device/gaming table where transaction event occurred
and/or other types of desired information relating to or concurrent with the identified transaction event.

As illustrated in the example embodiment of FIG. 10, at 1006, it is assumed that the casino server system receives updated financial transaction activity information other related information. For example, in one embodiment, the updated transaction activity information may include information relating to money in/out activities (e.g., cash-in/cash-out activities), game related data, wager amount information, and win amount.

In at least one embodiment, the received financial transaction information may be analyzed (1008) by the casino server system (and/or cloud-based system(s)) for detection of suspicious money laundering activities and/or other suspicious activities. Financial transactions which are flagged as potentially suspicious money laundering activities may be logged, and additional analysis may be performed if one or more specific triggering criteria is satisfied. For example, in at least one embodiment, a multi-step analysis process may be utilized for suspicious money laundering (ML) activity analysis, whereby all (or selected) financial transactions are each initially screened and analyzed (e.g., 1008, 1010) for one or more triggering events/conditions which, if satisfied, may necessitate additional (in-depth) suspicious ML activity analysis (e.g., 1012) of the identified financial transaction (e.g., as shown in FIG. 11).

Accordingly, as illustrated in the example embodiment of FIG. 10, as shown at 1008 and 1010, the received transaction information may be initially screened for threshold event(s)/condition(s) satisfying threshold ML analysis trigger criteria such as that previously described herein. As illustrated in the example embodiment of FIG. 10, if it is determined (1010) that an identified transaction meets or satisfies predefined threshold ML analysis trigger criteria, then, in response, in-depth suspicious ML activity analysis procedure(s) (such as, for example, Suspicious Activity Analysis Procedure of FIG. 11) may be triggered or initiated (1012) to further analyze the identified transaction for suspicious money laundering activities and/or other suspicious activities.

For example, in one embodiment, in-depth suspicious ML activity analysis may be triggered in response to detecting that total consecutive money cashed in (e.g., for a given player over a given time period such as, for example, 3 minutes) exceeds $3000 or some other specified threshold value. In some embodiments, a substantial cash in (e.g., at least $3000), follow by a minimum amount of gaming (e.g., at least 3 games of at least $20 wager each), followed by a cash out, can trigger a deeper analysis for suspicious ML activity. In some embodiments, in-depth suspicious ML activity analysis may be triggered in response to detecting that cumulative money cashed in for a given player over a given time period exceeds some specified threshold value. For example, frequent money-in into a gaming terminal, at 3-minute to 5-minute intervals, of $3000 or more each time, for a total of more than $10,000 in 15 minutes, may trigger a deeper analysis for suspicious ML activity. In some embodiments, in-depth suspicious ML activity analysis may be triggered in response to detecting that total consecutive money cashed out (e.g., for a given player over a given time period) such exceeds some specified threshold value. For example, frequent cash-out events at a gaming terminal, at 1-minute to 5-minute intervals, of $2000 or more each time, for a total of more than $9,000 over a 20-minute time window, may trigger a deeper analysis for suspicious ML activity. In some embodiments, in-depth suspicious ML activity analysis may be triggered in response to detecting that total money cashed out (for a given player over a given time period) exceeds some specified threshold value.

In yet other embodiments, the triggering of in-depth suspicious ML activity analysis may be based, at least partially, on statistical information relating to one or more group(s) of gaming devices over a period of time, and/or may be based, at least partially, on statistical information relating to other types of financial transactions which occur over one or more specified time periods(s). For example, financial transactions for a given gaming device (or a specified group of gaming devices) may be averaged over a specified time period or time interval (e.g., 90 days) to establish a relative baseline of what a "normal" transaction is for that particular gaming device (or group of gaming devices). Any detected financial transactions (new and/or historical) associated with the identified gaming device (or associated with one or more gaming devices of the identified group of gaming device) may then be compared to the baseline "normal" transaction. If, based on the results of the comparison(s), it is determined that an identified transaction exceeds predefined threshold comparison criteria (e.g., greater than 3 sigmas or 3 standard deviations higher than the baseline "normal" transaction), such a determination may trigger in-depth suspicious ML activity analysis of the identified new transaction.

By way of illustration, in one example, a statistical average analysis may be performed for cash-in transactions occurring at an identified gaming device over a 3-month time period. Based on this analysis it may be determined that the baseline "normal" cash-in transaction value and standard deviation value for the identified gaming device is $300, +/−$200. In one embodiment, the $300 value may represent the baseline "normal" cash-in transaction, and the "+/−$200" value may represent one standard deviation. One of the cash-in transactions which occurred during the analyzed 3-month time period relates to a cash-in transaction for $3000. This identified transaction may be determined to be about 13.5× standard deviations higher than the calculated baseline "normal" cash-in transaction for the identified gaming device, which may cause the triggering of in-depth suspicious ML activity analysis to be performed on the identified transaction. Another, (new) cash-in transaction for $1800 is detected at the identified gaming device. This newly identified transaction may be determined to be about 7.5× standard deviations higher than the calculated baseline "normal" cash-in transaction for the identified gaming device, which may cause the triggering of in-depth suspicious ML activity analysis to be performed on the newly identified transaction.

Similarly, in at least one embodiment, a statistical average analysis may be performed for cash-out transactions occurring at an identified gaming device over a 200-day moving time window. Based on this analysis it may be determined that the 200-day moving average, or the baseline "normal" cash-out transaction value and standard deviation value for the identified gaming device is $200, +/−$100. In one embodiment, the $200 value may represent the baseline "normal" cash-out transaction, and the "+/−$100" value may represent one standard deviation. One of the cash-out transactions which occurred during the analyzed 200-day moving time window relates to a cash-out transaction for $2000. This identified transaction may be determined to be about 18× standard deviations higher than the calculated baseline "normal" cash-out transaction for the identified gaming device, which may cause the triggering of in-depth suspicious ML activity analysis to be performed on the identified transaction. Another, (new) cash-out transaction for $800 is detected at the identified gaming device. This newly identified transaction may be determined to be about 6× standard deviations higher than the calculated baseline "normal" cash-out transaction for the identified gaming device, which may cause the triggering of in-depth suspicious ML activity analysis to be performed on the newly identified transaction.

It will be appreciated that the various types of baseline "normal" transaction and standard deviation criteria which may be generated and utilized for triggering of in-depth suspicious ML activity analysis may depend upon the desired types of financial transaction filter criteria to be applied (such as, for example, time period filter criteria, transaction date filter criteria, transaction day of week filter criteria, transaction time filter criteria, etc.). Additionally, in at least some embodiments, the range of acceptable standard deviation variance may also be used as a definable criteria for triggering of in-depth suspicious ML activity analysis. For example, any transactions which have been identified as exceeding 4× standard deviations from the baseline "normal" transaction may be flagged for in-depth suspicious ML activity analysis.

According to different embodiments, the techniques for analyzing selected financial transaction information and determining the various baseline "normal" transaction and standard deviation criteria (e.g., such as those described above with respect to single or individual gaming devices) may similarly be applied to one or more sets or groups of gaming devices. For example, in some embodiments, a statistical average analysis may be performed for cash-in transactions occurring at one or more identified group(s) of gaming devices over a specified time period. Similarly, in some embodiments, a statistical average analysis may be performed for cash-out transactions occurring at one or more identified group(s) of gaming devices over a specified time period.

In some embodiments, various types of pattern recognition techniques may be utilized or employed for identifying suspicious financial transactions which may correspond to one or more different types of money-laundering (ML) activities. Non-limiting examples of pattern recognition techniques may include, but are not limited to, one or more of the following (or combinations thereof):

Pattern recognition by location. Example: Group of gaming devices that are within a predefined proximity to each other (e.g., 20-meter proximity), and exhibit similar suspicious ML activities.

Pattern recognition by time. Example: Group of gaming devices that exhibit similar suspicious ML activities over a period of time (e.g., 2 hours).

Pattern recognition by transaction types. Example: Group of gaming devices that exhibit high cash-in, follow by minimal gaming activities, and then a cash out transaction.

Returning to the example embodiment of FIG. 10, if it is determined (1014) that a suspicious activity and/or potential money laundering transaction has been identified, then one or more automated response(s) may be initiated (e.g., 1016-1026) such as, for example, one or more of the following (or combinations thereof):

Logging Identified Transaction Activities (e.g., 1016).

Generating appropriate electronic reports describing the identified suspicious activity/transaction, and perform automated e-filing (as desired/required) (e.g., 1020). In at least one embodiment, this may include electronic filing of CTR reports, SAR reports, and/or other reports with appropriate governing agencies such as, for example Financial Crimes Enforcement Network (Fin-CEN), Local, State and Federal gaming regulators, casino security personnel, law enforcement officers, casino security managers, and the like.

Identification (e.g., 1018) of notification/alert subscribers in accordance with subscription preferences.

Generation and transmission (e.g., 1018) of notification and/or alert messages to designated casino personnel such as, for example, the nearest security officers, a casino manager, pit boss, etc. In some embodiments, the suspicious activity alert messages may be generated and transmitted in real-time or near real-time. In some embodiments, additional actions may be automatically implemented to verify the actual presence of security personnel on duty at any given time and/or to verify that the intended recipients of the suspicious activity alert messages have actually been received by those recipients. In some embodiments, a GUI representation of the casino floor may also be provided to facilitate casino personnel in quickly identifying the location of suspicious activity. According to different embodiments, different types of messaging protocols may be used for transmission of the alert messages such as, for example, push notification, pull notification (polling), SMS, email, RSS, and/or other types of messaging protocols or methods (as desired).

Generation and transmission of alert messages to local law enforcement.

Capture image of player (e.g., using casino security camera and/or gaming device camera).

Geolocation capture of suspicious transaction.

Geolocation capture of gaming device involved in suspicious transaction.

Geolocation capture of mobile device(s) associated with one or more persons involved with the identified suspicious activity.

Initiate geotracking (using, for example, WiFi/Cellular/GPS tracking techniques) of one or more persons involved with the identified suspicious activity.

Track casino chips in possession by one or more persons involved with the identified suspicious activity.

Delay completion of the transaction (e.g., prolong the transaction time), or hold the transaction processing, pending additional verifications and/or actions.

Etc.

In at least some embodiments, one or more different persons and/or entities may subscribe or register to receive alerts and/or notifications relating to various types of suspicious activities and/or potential money laundering transactions. Collectively, the various persons and/or entities who subscribe to receive selected suspicious activity/ML transaction alert(s) may be referred to as subscribers. According to different embodiments, there may be different classes of subscribers such as, for example:

Passive Subscribers such as a casino legal compliance manager who is merely monitoring, but who is not actively patrolling the casino floor.

Active subscribers such as a security office patrolling the casino floor (who may need to proactively respond to an alert by going to the physical location where the suspicious alert activity was detected to assess the situation.), or a security manager in the back room who may be required to take action in response to a detected alert (e.g., by dispatching additional security officers).

Other types of subscribers may include, but are not limited to: casino employees, security personnel, casino floor managers, casino floor pit bosses, law enforcement personnel, government personnel, gaming regulators, governmental agencies, gaming regulatory agencies, financial regulatory agencies, etc.

According to different embodiments, different persons and/or entities may each provide or configure their respective subscription preferences and other subscription rules/criteria for receiving alerts and/or notifications relating to desired types of suspicious activities and/or potential money laundering transactions. Examples of various types of subscription preferences, rules, and criteria may include, but are not limited to, one or more of the following (or combinations thereof):

Location-based criteria, such as, for example multiple incidents/events within a location (e.g., Zone ABC, bank EFG, carousel IJK, casinos in Las Vegas, etc.).

Time-based criteria, such as, for example events/incidents which occur within a specific time window (e.g., 1 hour, New Year's eve, 3 months, etc.).

Passive subscription criteria, such as, for example, casino manager, or gaming regulator, or other governmental personnel (FINCEN, NSA, CIA, etc.), who wants to keep informed of trends and general activities. For such subscribers, real time notification may not be a necessity, but periodic reports or digests of events/incidents may be desirable (e.g., daily, weekly, monthly, every month, etc.).

Active subscription criteria, such as, for example, casino security supervisor, casino dispatcher, and/or other persons who may wish to receive real-time alerts/notifications relating to one or more predefined types of suspicious activities and/or potential money laundering transactions.

Priority-based criteria, such as, for example: transactions involving over $100,000 total cash which occur within 1 hour of each other (e.g., highest priority); transactions involving over $10,000 total deposit within a 24 hour period (e.g., medium priority); transactions involving over $3000 cash in per event (e.g., regular priority); and/or other types of priority-based criteria described and/or referenced herein.

Access-level criteria, which, for example, may be based on access level authorization, security level authorization, job title, etc. For example, a shift supervisor of security who is responsible for monitoring specific region of a casino floor may be provided with real-time alerts/notifications about suspicious activities and/or potential money laundering transactions which have been detected as occurring within one of the casino floor regions for which the security shift supervisor is responsible for overseeing. In another example, a casino regulator may be provided with periodic updates relating to alert/notification trends at various locations within his state. A VP of Compliance for a chain of casinos may be provided with access for viewing all (or selected) alerts and trends relating to activities at each of the casino establishments of the casino chain (some of which may be located in different states and/or countries).

In some embodiments, alert/event monitoring may be performed at an operator control panel in a back room of the casino. In other embodiments, alert/event monitoring may be performed in mobile environments (e.g., while the monitoring person is on the move).

For example, in one embodiment, a security officer (who is determined to be on-duty) may receive an alert or notification (e.g., via SMS text alert) on his smart phone or other mobile device. The security office may tap on the alert to open an activity monitoring application on the mobile device which may display an interactive Alert Floor Map GUI of the casino floor (or portion thereof) and which may also highlight (e.g., by visual display) the gaming device/table/machine at which a suspicious activity or potential money laundering transaction event has been detected. In one embodiment, the security officer may interact with the Alert Floor Map GUI (e.g., by touching the highlighted gaming device) to access additional information and details relating to the nature of the alert, the transaction event(s), player identity, and/or other types of information relating to the detected suspicious activity or potential money laundering transaction event. In some embodiments, the mobile device and/or Alert Floor Map GUI may be configured or designed to include functionality for:

receiving an alert;

facilitating visual identification and location of the gaming device/table associated with the alert;

facilitating visual identification and current location a person or suspect associated with the alert;

visually identifying a current location of the user's mobile device;

generating/displaying visual directional information to assist the mobile device user (e.g., security officer) in efficiently navigating to the identified gaming device/table;

generating/displaying visual directional information to assist the mobile device user (e.g., security officer) in tracking the movements and/or future activities of the identified person or suspect associated with the alert;

accessing and displaying detailed information relating to the alert (e.g., nature of suspicious activity, location, suggested response for the security office based on the priority level of the alarm, etc.).

In some embodiments the degree of severity of an identified suspicious activity may also be assessed (e.g., in real-time) in order to determine, for example: (i) which type(s) of response action(s) should be performed (e.g., in response to detection of the identified suspicious activity), and/or (ii) the appropriate timeframe for initiating or implementing each response action to be performed. By way of illustration, non-exhaustive examples of different types of criteria may be considered when determining the degree of priority or urgency to be assigned to a given response action may include, but are not limited to, one or more of the following (or combinations thereof):

Time sensitivity. For example, if it is determined that there is a time sensitivity associated with a given response action, then it is preferable that the response action be implemented within an appropriate, predetermined timeframe takes into account the time sensitivity.

Amount of time which has elapsed since the detected event occurred.

Type of suspicious activity involved.

Amount of money involved.

Number of similar incidents within a given period (e.g., 48 hours).

Number of similar incidents within a geographical area (e.g., nearby gaming devices, within the casino gaming venue, within a 2-mile radius, within the city, etc.).

Transactions characteristics and/or transaction patterns that have been flagged or prioritized by law enforcement agencies.

Prior histories of person(s) involved in the suspicious activity. For example, if it is determined that the identity of one of the persons involved in the suspicious activity is a fugitive, it may be desirable to immediately notify law enforcement agencies and/or casino security personnel of the last known location of the identified fugitive.

Increased likelihood of apprehending one or more person(s) involved in the suspicious activity (e.g., if response activity is assigned high priority status).

Increased likelihood of identifying one or more person(s) involved in the suspicious activity (e.g., if response activity is assigned high priority status).

Increased likelihood of prevention of similar type(s) of suspicious activities from occurring in future (e.g., if response activity is assigned high priority status).

Some events may be assigned relatively higher priorities than other events. Assignment of relative priorities may depend upon the particular facts and/or conditions associated with each event. Additionally, in some embodiments, the degree of urgency or priority of dispatching alert(s) communications and/or notification(s) for a given event may be determined, at least partially, as a function of the priority associated with that event.

For example, detection of a $9000 cash-in event at a specific gaming device, followed by an $8990 cash-out event at the same gaming device within 1 minute may be assigned a high priority, or may be assigned a relatively higher priority than detection of a $9000 cash-in event at the gaming device, followed by an $8990 cash-out event at the same gaming device 2 hours later. In the former situation, it may be determined that there is a relatively high degree of urgency to immediately send out an alert to casino security and the casino floor supervisor, alerting them of the detected ML activity. In the latter situation, it may be determined that there is a relatively lower degree of priority (or no need) for sending out alert(s) communications relating to the detected event. In another example, a cash-out after a Jackpot win of $10,000 is may not be assigned as a high priority event for suspicious ML activity. However, in at least one embodiment, the detection of such an event will trigger a flag for automatic reporting purposes for causing the detected event to be logged and reported to the appropriate agencies for tax reporting purposes.

It will be appreciated that different embodiments of the Transaction Analysis and Suspicious Activity Screening and Notification Procedure (not shown) may include additional features and/or operations than those illustrated in the specific embodiment of FIG. 10, and/or may omit at least a portion of the features and/or operations of Transaction Analysis and Suspicious Activity Screening and Notification Procedure illustrated in the specific embodiment of FIG. 10.

FIG. 11 shows an example of a Suspicious Activity Analysis Procedure 1100 in accordance with a specific embodiment. In at least one embodiment, the Suspicious Activity Analysis Procedure 1100 may be configured or designed to perform in-depth suspicious ML activity analysis of identified transactions to further analyze the identified transactions for suspicious money laundering activities and/or other suspicious activities. In at least one embodiment, the Suspicious Activity Analysis Procedure 1100 may be initiated or triggered in response to determining that an identified transaction meets or satisfies predefined threshold ML analysis trigger criteria.

As shown at 1104, one or more specific transaction(s) may be identified for analysis. For purposes of simplification and clarification, it is assumed in the example embodiment of FIG. 11 that a specific transaction has been identified for in-depth suspicious activity analysis. In at least one embodiment, the identified transaction may correspond to a transaction which has previously been flagged for in-depth suspicious activity analysis.

As shown at 1106, various details associated with the identified transaction may be analyzed.

In at least one embodiment, such details may include, for example, one or more of the following (or combinations thereof): information identifying one or more persons involved in the transaction; information identifying the kiosk, gaming device, gaming table or other device(s) associated with transaction; transaction time/date; transaction location; transaction amount; win amount; etc. As shown at 1108, if desired, additional information relating to the identified transaction (if available) may be acquired, generated, and/or retrieved which may be relevant to suspicious ML activity analysis (and/or other suspicious activity analysis) of the identified transaction. In at least one embodiment, at least a portion of the additional information may be retrieved and/or accessed from one or more sources such as, for example: casino server system database(s), external database(s), etc. Examples of such additional information may include, but are not limited to, one or more of the following (or combinations thereof):

known associations between person performing suspicious activity and other persons;

information relating to concurrent conditions and/or events (e.g., relative to the identified transaction being analyzed);

information relating to historical transaction activities associated with the identified person;

game-related information (e.g., game ID, game play history, etc.);

wager-related information (e.g., credit meter, games won/lost, bet denomination, etc.);

information relating to identity (e.g., asset ID) and location of gaming device/gaming table where transaction event occurred;

information relating to identity of other gaming device(s) and/or gaming table(s) (e.g., gaming devices/tables near to where the suspicious transaction event occurred) in which similar suspicious transaction events have recently been detected (e.g., within the past 4 hours);

information relating to identity of gaming table attendant(s) servicing gaming table/gaming device at time of transaction event;

information relating to identities of other players participating at the gaming table/gaming device at time of transaction event;

information relating to identity of gaming table attendant(s) (e.g., dealer, croupier(s), hostess(es), etc.) servicing gaming table/gaming device at time of transaction event;

information relating to identity and location of financial kiosk machine where transaction event took place;

information relating to identity and location of cashier cage where transaction event took place;

information relating to identity of cashier attendant(s) on duty at cashier cage where transaction event took place;

Casino ID and location;

and/or other types of desired information relating to or concurrent with the identified transaction event.

As shown at 1110, pattern information relating to ML activity and/or other types of suspicious activity may be accessed and/or retrieved from one or more Suspicious Activity/ML Activity Pattern Database(s) (such as, for example, 892, FIG. 8). In at least one embodiment, the suspicious activity/ML activity pattern information may include predefined sets of rules and other criteria for use in facilitating suspicious/ML activity analysis, comparison, and detection.

As shown at 1112, details of the identified transaction and the additional acquired information may be analyzed for suspicious/potential ML activity using the retrieved suspicious/ML activity pattern data. In at least one embodiment, the Suspicious Activity Analysis Procedure may determine and assign (1114) respective match probability values for selected ML patterns and/or other suspicious activity patterns based on analyzed details of the identified transaction and additional acquired information.

As shown at 1116, selected transaction details relating to the identified transaction may be logged along with the calculated pattern match probability values. In at least one embodiment, this archive of historical transaction analysis information may be used for future analysis and/or detection of suspicious ML activity.

In at least one embodiment, if at least one pattern match is identified (1118) for which the associated calculated pattern match probability value meets or exceeds predefined minimum threshold criteria (e.g., pattern match probability value>50%), then the identified transaction may be flagged (1120) as suspicious/potential money laundering transaction.

Additional financial transactions flagged for in-depth suspicious activity analysis may be analyzed (1122) in a similar manner to that described above.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented system for facilitating monitoring of financial transactions occurring at a casino gaming establishment, the casino gaming establishment including a casino gaming network, the system comprising:
   at least one processor;
   at least one interface operable to establish a communication link to at least one network device;
   a memory storing a plurality of instructions;
   a Transaction Monitoring and Analysis system;
   the at least one processor being operable to execute the plurality of instructions stored in the memory, and being operable to operate with the memory and the at least one interface to:
   cause the Transaction Monitoring and Analysis system to automatically detect an occurrence of a first financial transaction event at the casino gaming establishment, the first financial transaction event involving a creation or use of a first note of currency or non-RFID credit voucher at a first location of the casino gaming establishment, the first financial transaction event having associated therewith a first set of transaction event details; and
   cause the Transaction Monitoring and Analysis system to automatically track a real-time location of the first note of currency or non-RFID credit voucher at the casino gaming establishment during at least a first subsequent time interval.

2. The computer implemented system of claim 1 further comprising a first electronic gaming device ("first EGD") communicatively coupled to the casino gaming network, the first electronic gaming device including a credit voucher dispenser;
   wherein the first financial transaction event corresponds to a dispensing of a first credit voucher at the first electronic gaming device;
   the computer implemented system being further operable to cause the Transaction Monitoring and Analysis system to automatically track a real-time location of the first credit voucher at the casino gaming establishment during at least a portion of the first subsequent time interval.

3. The computer implemented system of claim 1 further comprising a first currency dispensing station communicatively coupled to the casino gaming network;
   wherein the first financial transaction event corresponds to a dispensing of a first note of currency at the first currency dispensing station;
   the computer implemented system being further operable to cause the Transaction Monitoring and Analysis system to automatically track a real-time location of the first note of currency at the casino gaming establishment during at least a portion of the first subsequent time interval.

4. The computer implemented system of claim 1 further comprising a first credit voucher dispensing machine communicatively coupled to the casino gaming network;
   wherein the first financial transaction event corresponds to a dispensing of a first credit voucher at the first credit voucher dispensing machine;
   the computer implemented system being further operable to cause the Transaction Monitoring and Analysis system to automatically track a real-time location of the first credit voucher at the casino gaming establishment during at least a portion of the first subsequent time interval.

5. The computer implemented system of claim 1 further comprising a first electronic gaming table communicatively coupled to the casino gaming network, the first electronic gaming table including a casino chip dispenser;
   wherein the first financial transaction event corresponds to a dispensing of a first casino chip at the first electronic gaming table;
   the computer implemented system being further operable to cause the Transaction Monitoring and Analysis system to automatically track a real-time location of the first casino chip at the casino gaming establishment during at least a portion of the first subsequent time interval.

6. The computer implemented system of claim 1 further comprising:
   a first electronic gaming device ("first EGD") communicatively coupled to the casino gaming network, the first electronic gaming device including a first bill or ticket acceptor, the first electronic gaming device being operable to enable a player to engage in wager-based gaming activities at the first electronic gaming device;
   the first electronic gaming device being operable to establish an account balance using funds received via the first bill or ticket acceptor; and
   the first electronic gaming device being operable to fund at least one wager-based activity using at least a portion of the account balance.

7. The computer implemented system of claim 1 being further operable to cause the at least one processor to execute additional instructions to:

cause the Transaction Monitoring and Analysis system to automatically track a real-time usage of the first note of currency or non-RFID credit voucher at the casino gaming establishment over a second subsequent time interval.

8. The computer implemented system of claim 1:
wherein the first note of currency or non-RFID credit voucher corresponds to a tangible note of currency or credit voucher;
the computer implemented system being further operable to cause the cause the Transaction Monitoring and Analysis system to:
automatically track a real-time physical location of the tangible note of currency or credit voucher at the casino gaming establishment over a second subsequent time interval.

9. The computer implemented system of claim 1 being further operable to cause the at least one processor to execute additional instructions to:
cause the Transaction Monitoring and Analysis system to automatically determine a respective identity any person who is in possession of the first note of currency or non-RFID credit voucher during a second subsequent time interval.

10. The computer implemented system of claim 1 being further operable to cause the at least one processor to execute additional instructions to:
cause the Transaction Monitoring and Analysis system to automatically identify at least one person involved in the first financial transaction event; and
cause the Transaction Monitoring and Analysis system to automatically track any instruments of credit in possession of the at least one person during a second subsequent time interval.

11. The computer implemented system of claim 1 being further operable to cause the at least one processor to execute additional instructions to:
cause the Transaction Monitoring and Analysis system to automatically identify a first group of persons involved with the first financial transaction event; and
cause the Transaction Monitoring and Analysis system to automatically track any instruments of credit in the possession of any of the first group of persons during a second subsequent time interval.

12. The computer implemented system of claim 1 being further operable to cause the at least one processor to execute additional instructions to:
cause the Transaction Monitoring and Analysis system to automatically identify at least one person involved in the first financial transaction event; and
cause the Transaction Monitoring and Analysis system to automatically initiate geotracking of the at least one person during a second subsequent time interval.

13. The computer implemented system of claim 1 being further operable to cause the at least one processor to execute additional instructions to:
cause the Transaction Monitoring and Analysis system to automatically identify at least one person involved with the first financial transaction event; and
cause the Transaction Monitoring and Analysis system to generate a first alert or notification identifying the at least one person.

14. A computer implemented method for facilitating monitoring of financial transactions occurring at a casino gaming establishment, the casino gaming establishment including a casino gaming network and a a Transaction Monitoring and Analysis system, the method comprising causing at least one processor to execute a plurality of instructions to:
cause the Transaction Monitoring and Analysis system to automatically detect an occurrence of a first financial transaction event at the casino gaming establishment, the first financial transaction event involving a creation or use of a first note of currency or non-RFID credit voucher at a first location of the casino gaming establishment, the first financial transaction event having associated therewith a first set of transaction event details; and
cause the Transaction Monitoring and Analysis system to automatically track a real-time location of the first note of currency or non-RFID credit voucher at the casino gaming establishment during at least a first subsequent time interval.

15. The computer implemented method of claim 14, wherein the casino gaming network further comprises a first electronic gaming device ("first EGD") communicatively coupled to the casino gaming network, the first electronic gaming device including a credit voucher dispenser;
wherein the first financial transaction event corresponds to a dispensing of a first credit voucher at the first electronic gaming device;
the computer implemented method further comprising causing the Transaction Monitoring and Analysis system to automatically track a real-time location of the first credit voucher at the casino gaming establishment during at least a portion of the first subsequent time interval.

16. The computer implemented method of claim 14 wherein the casino gaming network further comprises a first currency dispensing station communicatively coupled to the casino gaming network;
wherein the first financial transaction event corresponds to a dispensing of a first note of currency at the first currency dispensing station;
the computer implemented method further comprising causing the Transaction Monitoring and Analysis system to automatically track a real-time location of the first credit voucher at the casino gaming establishment during at least a portion of the first subsequent time interval.

17. The computer implemented method of claim 14 wherein the casino gaming network further comprises a first credit voucher dispensing machine communicatively coupled to the casino gaming network;
wherein the first financial transaction event corresponds to a dispensing of a first credit voucher at the first credit voucher dispensing machine;
the computer implemented method further comprising causing the Transaction Monitoring and Analysis system to automatically track a real-time location of the first note of currency at the casino gaming establishment during at least a portion of the first subsequent time interval.

18. The computer implemented method of claim 14 wherein the casino gaming network further comprises a first electronic gaming table communicatively coupled to the casino gaming network, the first electronic gaming table including a casino chip dispenser;
wherein the first financial transaction event corresponds to a dispensing of a first casino chip at the first electronic gaming table;
the method further comprising causing the at least one processor to execute instructions to:

cause the Transaction Monitoring and Analysis system to automatically track a real-time location of the first casino chip at the casino gaming establishment during at least a portion of the first subsequent time interval.

19. The computer implemented method of claim 14 wherein the casino gaming network further comprises a first electronic gaming device ("first EGD") communicatively coupled to the casino gaming network, the first electronic gaming device including a first bill or ticket acceptor, the first electronic gaming device being operable to enable a player to engage in wager-based gaming activities at the first electronic gaming device;

the method further comprising causing the at least one processor to execute instructions to:

cause the first electronic gaming device to establish an account balance using funds received via the first bill or ticket acceptor; and cause the first electronic gaming device to fund at least one wager-based activity using at least a portion of the account balance.

20. The computer implemented method of claim 14 further comprising causing the at least one processor to execute additional instructions to:

cause the Transaction Monitoring and Analysis system to automatically track a real-time usage of the first note of currency or non-RFID credit voucher at the casino gaming establishment over a second subsequent time interval.

21. The computer implemented method of claim 14:

wherein the first note of currency or non-RFID credit voucher corresponds to a tangible note of currency or credit voucher;

the method further comprising causing the at least one processor to execute instructions to:

cause the Transaction Monitoring and Analysis system to automatically track a real-time physical location of the tangible note of currency or credit voucher at the casino gaming establishment over a second subsequent time interval.

22. The computer implemented method of claim 14 further comprising causing the at least one processor to execute instructions to:

cause the Transaction Monitoring and Analysis system to automatically determine a respective identity any person who is in possession of the first note of currency or non-RFID credit voucher during a second subsequent time interval.

23. The computer implemented method of claim 14 further comprising causing the at least one processor to execute instructions to:

cause the Transaction Monitoring and Analysis system to automatically identify at least one person involved in the first financial transaction event; and cause the Transaction Monitoring and Analysis system to automatically track any instruments of credit in possession of the at least one person during a second subsequent time interval.

24. The computer implemented method of claim 14 further comprising causing the at least one processor to execute instructions to:

cause the Transaction Monitoring and Analysis system to automatically identify a first group of persons involved with the first financial transaction event; and cause the Transaction Monitoring and Analysis system to automatically track any instruments of credit in the possession of any of the first group of persons during a second subsequent time interval.

25. The computer implemented method of claim 14 further comprising causing the at least one processor to execute instructions to:

cause the Transaction Monitoring and Analysis system to automatically identify at least one person involved in the first financial transaction event; and cause the Transaction Monitoring and Analysis system to automatically initiate geotracking of the at least one person during a second subsequent time interval.

26. The computer implemented method of claim 14 further comprising causing the at least one processor to execute instructions to:

cause the Transaction Monitoring and Analysis system to automatically identify at least one person involved with the first financial transaction event; and cause the Transaction Monitoring and Analysis system to generate a first alert or notification identifying the at least one person.

* * * * *